United States Patent
Dias Bispo Carvalho et al.

(10) Patent No.: US 11,645,757 B2
(45) Date of Patent: May 9, 2023

(54) METHOD OF AND APPARATUS FOR ANALYZING IMAGES

(71) Applicant: FUGRO N.V., Leidschendam (NL)

(72) Inventors: Diego Dias Bispo Carvalho, The Hague (NL); Evert Schippers, Leidschendam (NL); Arnoud Marc Jongsma, Vijfhuizen (NL); Michal Pasternak, Leidschendam (NL); Francisco Javier Tegedor Navarro, Warsaw (PL)

(73) Assignee: FUGRO N.V., Leidschendam (NL)

( * ) Notice: Subject to any disclaimer, the term of this patent is extended or adjusted under 35 U.S.C. 154(b) by 411 days.

(21) Appl. No.: 16/968,517

(22) PCT Filed: Feb. 8, 2019

(86) PCT No.: PCT/NL2019/050084
§ 371 (c)(1),
(2) Date: Aug. 7, 2020

(87) PCT Pub. No.: WO2019/156563
PCT Pub. Date: Aug. 15, 2019

(65) Prior Publication Data
US 2021/0042522 A1 Feb. 11, 2021

(30) Foreign Application Priority Data
Feb. 8, 2018 (NL) ..................................... 2020405

(51) Int. Cl.
*G06T 7/187* (2017.01)
*G06T 7/80* (2017.01)
*G06T 7/70* (2017.01)

(52) U.S. Cl.
CPC ................ *G06T 7/187* (2017.01); *G06T 7/70* (2017.01); *G06T 7/80* (2017.01); *G06T 2207/10028* (2013.01); *G06T 2207/20221* (2013.01)

(58) Field of Classification Search
CPC .......... G06V 20/00; G06T 7/187; G06T 7/70; G06T 7/80; G06T 2207/10028; G06T 2207/20221; G06T 2207/20021
See application file for complete search history.

(56) References Cited

U.S. PATENT DOCUMENTS

| | | | |
|---|---|---|---|
| RE44,925 E * | 6/2014 | Vincent .................. | G01C 11/02 348/208.14 |
| 9,109,889 B2 * | 8/2015 | Soubra ...................... | G06T 7/73 |

(Continued)

FOREIGN PATENT DOCUMENTS

WO 2019156563 A3 8/2019

OTHER PUBLICATIONS

International Search Report and Written Opinion; PCT Application No. PCT/NL2019/050084; dated Aug. 27, 2019.

(Continued)

*Primary Examiner* — Molly Wilburn
(74) *Attorney, Agent, or Firm* — Polsinelli PC

(57) ABSTRACT

Apparatus for determining a spatial property in a 3D-space, wherein the apparatus comprises a physical pointer, a camera and a position and orientation measurement system, wherein a first object in the 3D-space comprises a pattern on it, wherein the physical pointer is configured to contact a surface area of a second object in the 3D-space, wherein the camera is configured to capture, at a position of the camera with respect to the first object, image data comprising an image of the pattern; wherein the position and orientation measurement system is configured to determine a heading, (Continued)

position, verticality, attitude, and/or inclination of the camera based on the image of the pattern, and determine, based on the determined heading, position, verticality, attitude, and/or inclination of the camera and a relative position of the physical pointer with respect to the camera, the spatial property of the surface area by the physical pointer.

12 Claims, 17 Drawing Sheets

(56) References Cited

U.S. PATENT DOCUMENTS

| | | | | |
|---|---|---|---|---|
| 9,134,127 | B2* | 9/2015 | Soubra | G01S 19/485 |
| 11,348,269 | B1* | 5/2022 | Ebrahimi Afrouzi | A47L 11/4041 |
| 2006/0209186 | A1* | 9/2006 | Iyoda | H04N 5/23206 348/E5.042 |
| 2009/0097039 | A1* | 4/2009 | Kawasaki | G01B 11/2509 356/603 |
| 2009/0231270 | A1* | 9/2009 | Vartiainen | G06F 1/169 345/156 |
| 2012/0330601 | A1* | 12/2012 | Soubra | G06T 7/73 702/150 |
| 2014/0156219 | A1* | 6/2014 | Soubra | G01C 15/06 702/150 |
| 2014/0184749 | A1* | 7/2014 | Hilliges | H04N 13/20 348/47 |
| 2014/0324249 | A1* | 10/2014 | Lacaze | G05D 1/0038 701/2 |
| 2019/0113937 | A1* | 4/2019 | Sasaki | G08G 5/0073 |
| 2021/0123717 | A1* | 4/2021 | Wierda | G01B 21/04 |

OTHER PUBLICATIONS

Playne, Daniel Peter et al., "A New Algorithm for Parallel Connected-Component Labelling on GPUs", IEEE Transactions on Parallel and Distributed Systems; vol. 29, No. 6, Jan. 30, 2018; pp. 1217-1230.

Park, Jung-Me et al., "Fast Connected Component Labeling Algorithm Using A Divide and Conquer Technique", 15th International Conference on Computers and their Applications; Jan. 1, 2000; pp. 1-4.

Chen, Jun et al., "Efficient Parallel Connected Component Labeling With a Coarse-to-Fine Strategy", IEEE Access vol. 6; Jan. 26, 2018; pp. 55731-55740.

* cited by examiner (a)   (b)

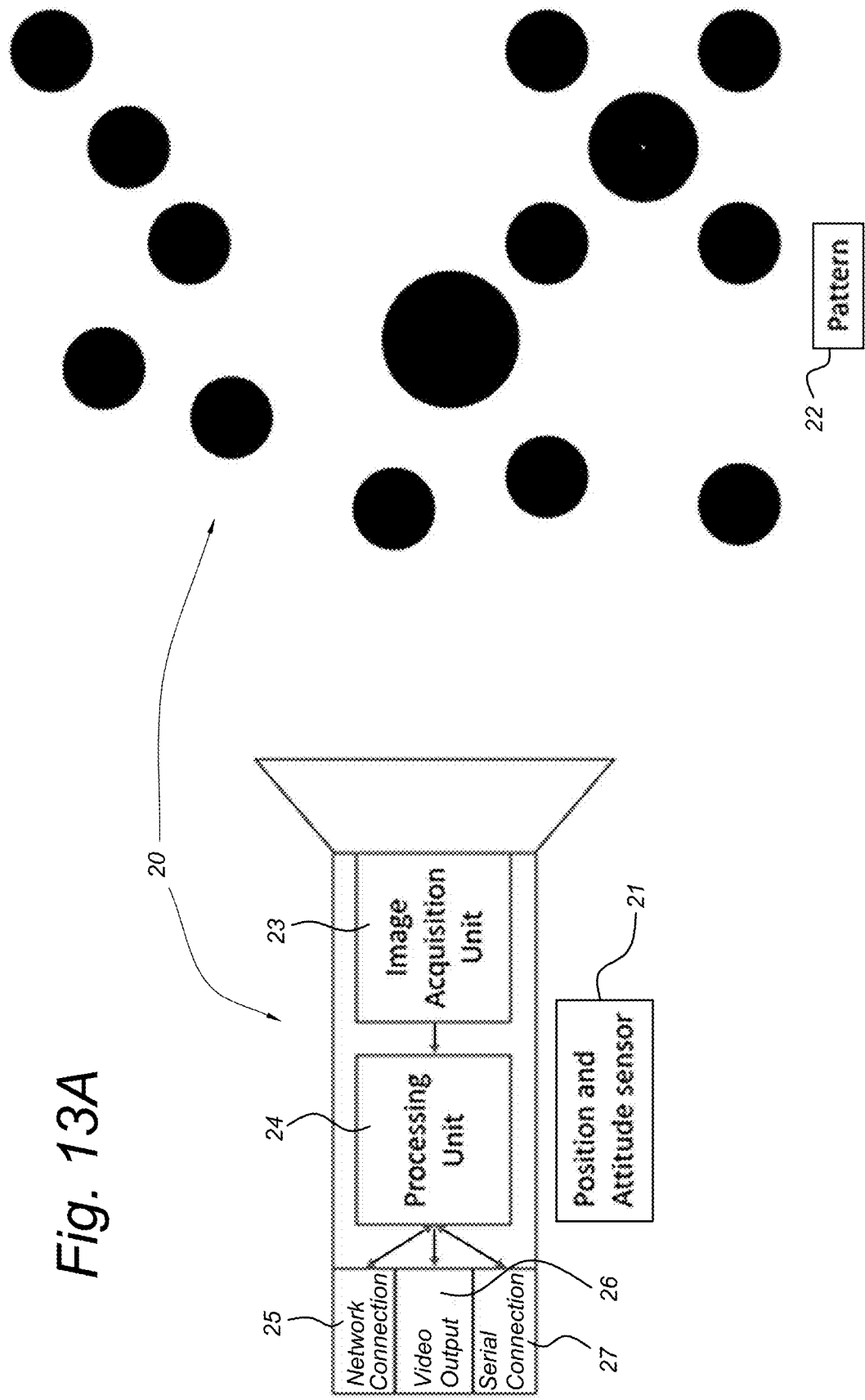

METHOD OF AND APPARATUS FOR ANALYZING IMAGES

CROSS-REFERENCE TO RELATED APPLICATIONS

This application is a national stage application of International Application No. PCT/NL2019/050084, which was filed on Feb. 8, 2019, which claims priority to Netherlands Application Number 2020405 filed on Feb. 8, 2018, of which is incorporated by reference in its entirety.

FIELD OF THE INVENTION

The present invention relates to a method of and apparatus for analyzing an image. The invention relates further to a method of and apparatus for performing tracking or positioning of an object based on a pattern in one or more images. The invention relates as well to a method of an apparatus for 3D scanning based on a pattern. Furthermore, the invention relates to a method of and an apparatus for allowing autonomous rendezvous and docking of two objects like spacecrafts.

BACKGROUND ART

EP1596331 discloses a position/orientation determination unit for determining a position and an orientation of an imaging device including an image input unit, a data memory, an index detector, an orientation sensor unit, an orientation prediction unit, and a position/orientation calculator, wherein indices to be shot by the imaging device are arranged at a plurality of positions in a real space and wherein the position/orientation calculator receives a predicted orientation of the imaging device and a set of image coordinates and world coordinates of each index detected by the index detector from the data memory. Then, EP1596331 discloses that the position/orientation calculator calculates the position and orientation of the imaging device on the basis of the received information and outputs the result of calculation to an external device. This position/orientation algorithm is rather complex and it does not allow for an efficient parallelization and use of the memory in order to reduce the computing time and the resource consumption.

EP1852821 discloses a position/orientation measurement apparatus wherein an image including indices laid out on a space is captured, and the indices are detected from the captured image. In this document, when a plurality of indices are detected, their distribution range is calculated, and an algorithm to be applied in position/orientation calculations is selected according to the size of the range. For example, when the indices are distributed over a sufficiently broad range, six parameters of the position and orientation of an image capture device are calculated as unknowns. EP1852821 also shows that, as the distribution range of the indices becomes smaller, the degrees of freedom of unknown parameters to be calculated are reduced. Once again, the recursive nature of this process for calculating the position/orientation is time and resource consuming and does not allow for an efficient parallelization and resource allocation.

Three Dimensional (3D) scanning, also called 3D data acquisition and reconstruction, is the generation of three-dimensional or spatiotemporal models from sensor data. Several existing techniques working with different kinds of sensors are known. These sensor types include among others optical, acoustic, laser scanning, radar and thermal sensors.

For instance, Light Imaging, Detection and Ranging (LIDAR) can be used for 3D data acquisition and reconstruction. LIDAR is a surveying method that measures distance to a target by illuminating the target with pulsed laser light and measuring the reflected pulses with a sensor. Differences in laser return times and wavelengths can then be used to make digital 3-D representations of the target.

However, A LIDAR device is very expensive. Furthermore, in order to capture locations which are not visible in one shot, multiple clouds of points need to be acquired and stitched. This means that for scanning an object, multiple acquisitions of data need to be performed.

Photogrammetry is another technique used for 3D data acquisition and reconstruction. In photogrammetry, measurements are taken from photographs, especially for recovering the exact positions of surface points. For instance, the distance between two points that lie on a plane parallel to the photographic image plane, can be determined by measuring their distance on the image.

However, photogrammetry requires feature-rich surfaces to be reconstructed and precise planning for proper data collection to prevent biased and inaccurate results. That means it requires specialists to perform the survey and, for bigger structures, it is hard to acquire imagery from all required sides of the structure.

A laser striper is also known for 3D acquisition and reconstruction. However, a laser striper can only 3D reconstruct a single stripe and it needs to be installed on an accurate rotation stage, resulting in similar disadvantages as using a LIDAR device.

A structured-light 3D scanner is a 3D scanning device for measuring the 3D shape of an object using projected light patterns and a camera system. It would reconstruct patches of the patch to be stitched. However, as photogrammetry, the results could be biased and inaccurate without proper planning. Structured light or Time of Flight (TOF) cameras show similar disadvantages as a structured-light 3D scanner.

Another known 3D scanning technique consists on determining different point locations with respect to each other. For this purpose, data could be acquired by using for instance total station, a tape measure, a Global Positioning System (GPS) or extracting points from the cloud obtained using any of the previous 3D scanning techniques.

A total station is an electronic/optical instrument used for surveying and building construction. It is an electronic transit theodolite integrated with electronic distance measurement to measure both vertical and horizontal angles and the slope distance from the instrument to a particular point, and an on-board computer to collect data and perform triangulation calculations. However, total station is expensive and the measured points need often to be prepared with reflective tape or prisms. Furthermore, when points need to be surveyed which are not visible from a single point, the total station needs to move and control point matching is required to connect datasets. Using tape measure is cumbersome and often not applicable to get full 3D offsets. It measures only distances and further processing is required to compute offsets in a reference frame if even possible. GPS only works in outside environments and cannot reach every spot. Also standalone GPS accuracy without augmentation is not reliable. Finally, extracting points from the cloud obtained using any of the previous 3D scanning techniques shows similar draw backs as it has been explained and the additional burden to have to process pick points manually from the data.

There are also well known techniques for real-time 3D positioning such as, for instance, using a robotic total station or GPS. However, a robotic total station can only track small movements in a low update rate with the risk of losing track of the prism that is tracked, requiring manual intervention to re-initialize, and GPS only works outside with limited accuracy (typically meter-level accuracy, but can get significantly worse in case of marginal signal tracking conditions)

Finally, real time full position and attitude can be achieved by using robotic total station or GPS together with inertial sensors and software integration. Once more, this shows the similar draw backs as the ones associated to the use of robotic total stations or GPS. Furthermore, extra sensors on the to-navigate vessel are needed, which can be expensive, require extra power and an extra datalink.

US2010/0092079 A1 discloses a photogrammetry target including a background having a first color and a plurality of ovoid regions located on the background and having a second color contrasting the first color, and a method and system for detecting the target and processing image data captured from the target to discern therefrom at least one of a distance to the target, identification of the target, or pose of the target.

Space crafts, such for instance satellites, in Low Earth Orbit (LEO) have a small momentary field of view, only able to observe and communicate with a fraction of the Earth at a time. There are several well-known concepts which are used for positioning purposes in LEO without ground tracking, such as for instance absolute standalone Global Navigation Satellite System (GNSS) positioning, relative GNSS positioning and relative positioning video systems. However, the current state-of-the-art techniques have a number of limitations:

Standalone GNSS positioning is not accurate enough when the distance is below 10 meters, and therefore GNSS-only positioning can be used only up to a significant distance to the target (for instance more than 100 meters) for safety reasons.

The limited absolute GNSS accuracy imposes a requirement such that a high-performance optical camera is required for a chaser spacecraft to identify a target's spacecraft position using only a vision-based system.

A single-sensor system (either based on GNSS or vision) cannot entirely provide integrity information due to estimation errors that cannot be easily quantified in real-time.

The transmission of GNSS data from the target spacecraft to the chaser spacecraft typically requires a Radio Frequency (RF) inter-satellite communication link thereby resulting in additional power, additional antenna elements and extra weight for both the chaser and the target spacecrafts.

Therefore, also an improved method and apparatus for positioning in LEO is needed.

SUMMARY OF THE INVENTION

The problem addressed by the present document is how to perform tracking or positioning of an object based on image analysis. More specifically, the addressed problem relates to monitoring objects via the detection of a predetermined pattern in an image.

Furthermore, the addressed problem relates to allowing autonomous rendezvous and/or docking of two objects like two spacecrafts (a target and a chaser) in LEO in a safe and automated manner without human intervention.

Accordingly the present invention provides an apparatus and method as defined in independent claims 8-11. This allows to avoid to have an external processing unit located meters or even kilometers away (in the case of subsea inspection), additional cables to send bidirectional data between the image acquisition unit and the external processing unit locate remotely in the vessel and it avoids as well the installation of dedicated middleware and software in the external processing unit to handle the data generated by the image acquisition unit and to process it.

Furthermore, the invention provides several advantages such as portability due to the fact that the device is self-contained and, therefore, it does not require an external processing unit. This property allows the sensor to be used in scenarios where the installation of such external processing unit is not possible. It provides as well robustness, as the device does not require external aiding, therefore, it works independently of any additional signal communication. The device could be used on autonomous vehicles without the need of human intervention.

Furthermore, the present document addresses the problem of providing an efficient pattern generation algorithm for calculating spatial properties of objects.

Accordingly the present invention also provides an apparatus and method as defined in claims 20-22 wherein a pattern of dots having random location, random radius and a constraint in the distance between the different dots is generated. In this way, due to the fact that the dots can be identified, not all dots need to be seen in an image. As long as enough dots are observed to estimate the camera pose, the goal of the invention is achieved and spatial property of objects or the camera can be calculated. The random size of the pattern of dots, allows for small dots to be seen at close range and large dots to be seen at larger ranges. The minimum and maximum radius of the dots determine the range at which the camera pose can be estimated. Patterns can be arbitrarily large, from a single sheet of paper to a whole wall or ceiling or even an entire seabed. The randomness of the size and the location makes the neighbourhood for every single dot unique. This allows for the identification of the dots without the need for extra identification features like bar codes or orientation markers.

Furthermore, the present document addresses the problem of providing for an efficient parallelization and memory allocation in an image analysing algorithm.

Accordingly the present invention also provides an apparatus as defined in claims 1-7, wherein an image of elements is processed in order to assign labels to the different elements wherein these labels expressed neighbourhood relations among the elements. The image domain is divided into smaller quadrants, called nodes, the labelling process can be optimized and executed in parallel in multiple cores of a GPU, for instance. This is due to the fact that the nodes can be processed independently and therefore, in parallel. After each node is processed, it is merged together with other adjacent nodes. This process is repeated iteratively until every node has been checked against all its adjacent nodes. In order to process the nodes in parallel, the data structures that hold the labels of the nodes are organized such that memory conflicts are prevented.

Furthermore, the present invention provides an apparatus and method as defined in claims 23-30. High-accuracy GNSS positioning allows to reduce the safety distance between the target and the chaser down to a few meters, thereby removing the need for sophisticated large or high-resolution cameras for the chaser, or the amount of power required for the Light Emitting Diodes (LEDs) in the target. The light transmission of GNSS data allows to re-use the vision system for both navigation and communication. In this way additional payloads are avoided on-board. Furthermore, the combination of both a high-accuracy GNSS and a vision system allows to detect a risk for the integrity of the spacecrafts when the relative distance computed separately from the vision system and the GNSS data do not agree. This real-time check between two independent sensors allows to automatically abort the rendezvous manoeuvre in case a collision risk is detected.

Also, the invention provides some methods as claimed in further independent claims. Advantageous embodiments are claimed in other dependent claims.

BRIEF DESCRIPTION OF THE DRAWINGS

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

Figure 1:
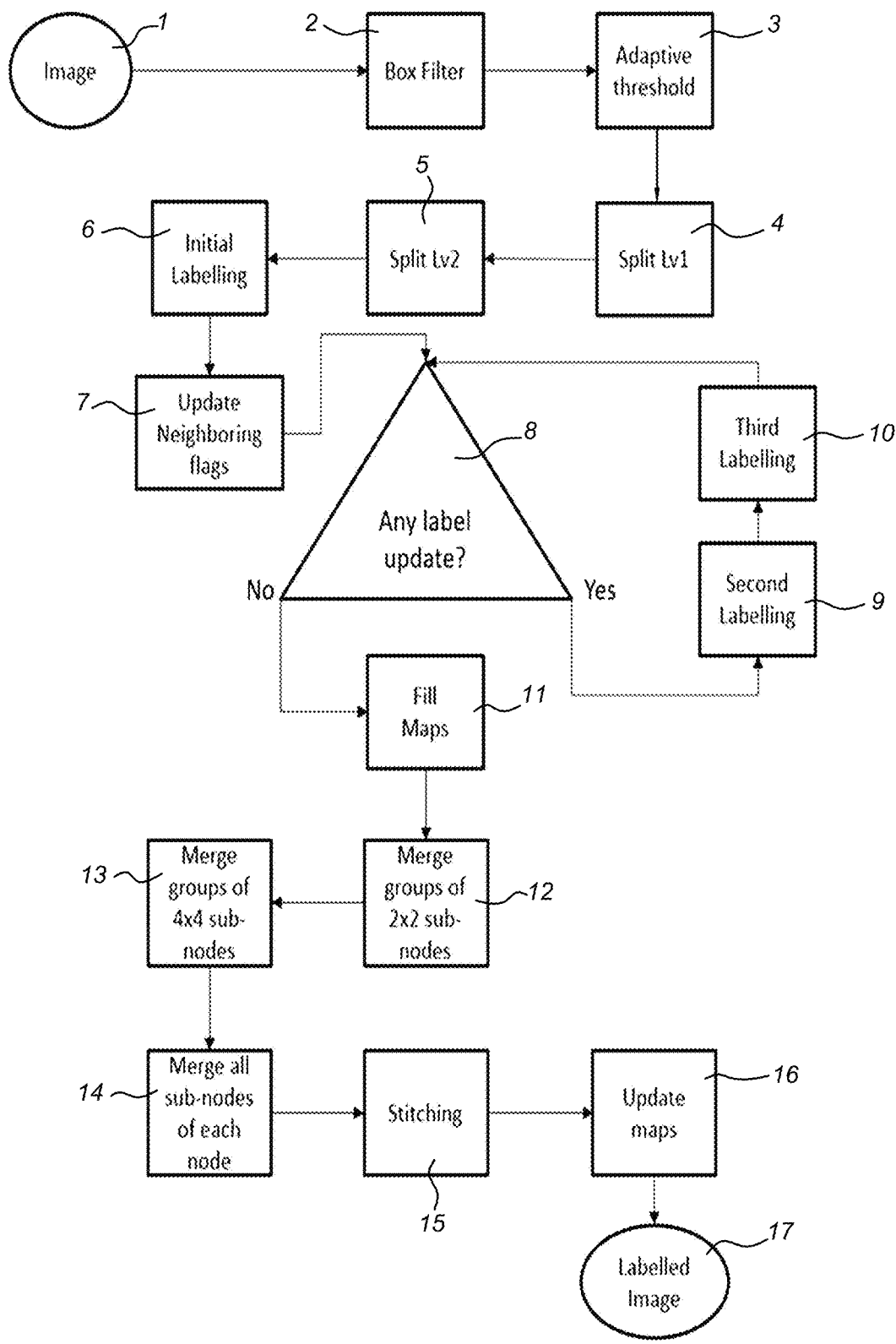

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element. The expression "configured to (or set to)" as used herein may be used interchangeably with "suitable for" "having the capacity to" "designed to" "adapted to" "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

Figure 2:
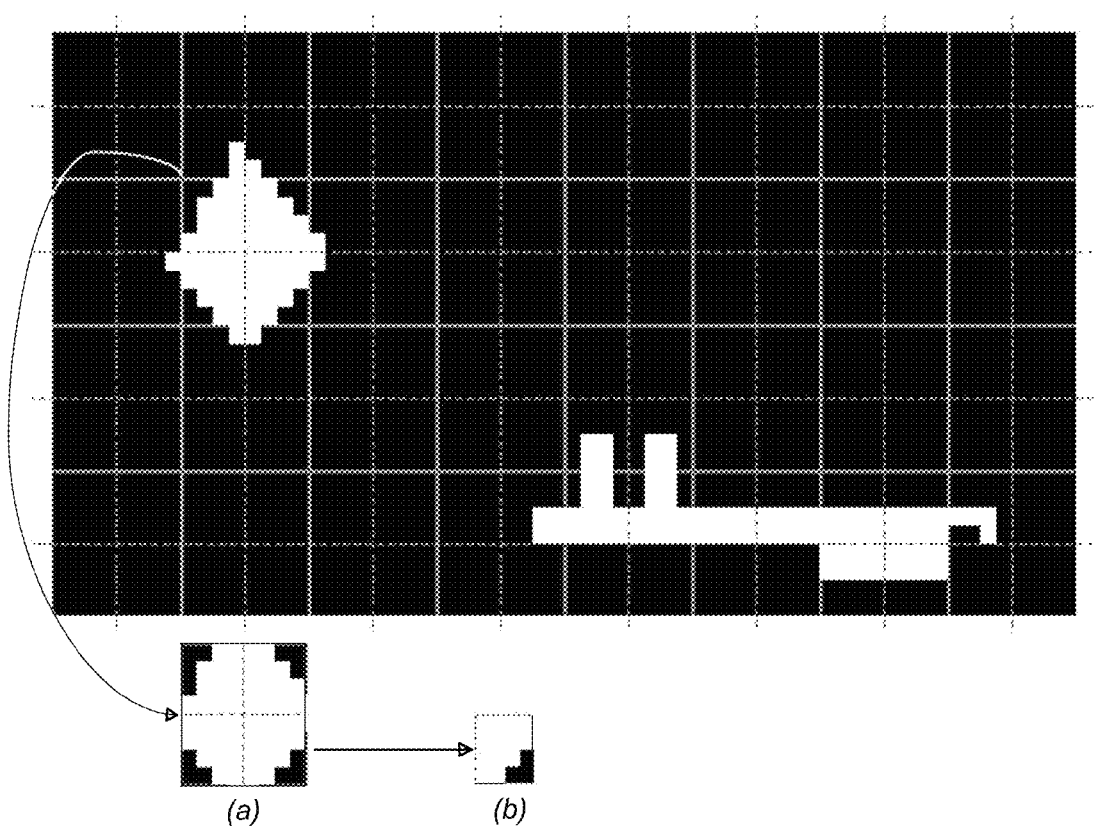
Figure 3:
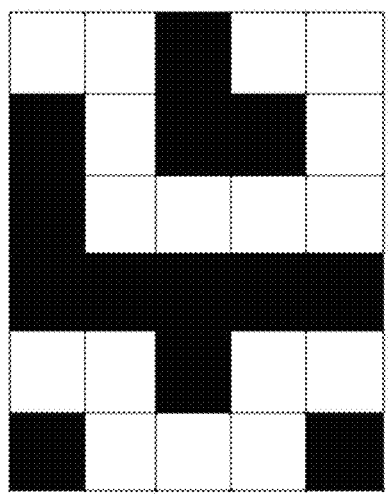
Figure 4:
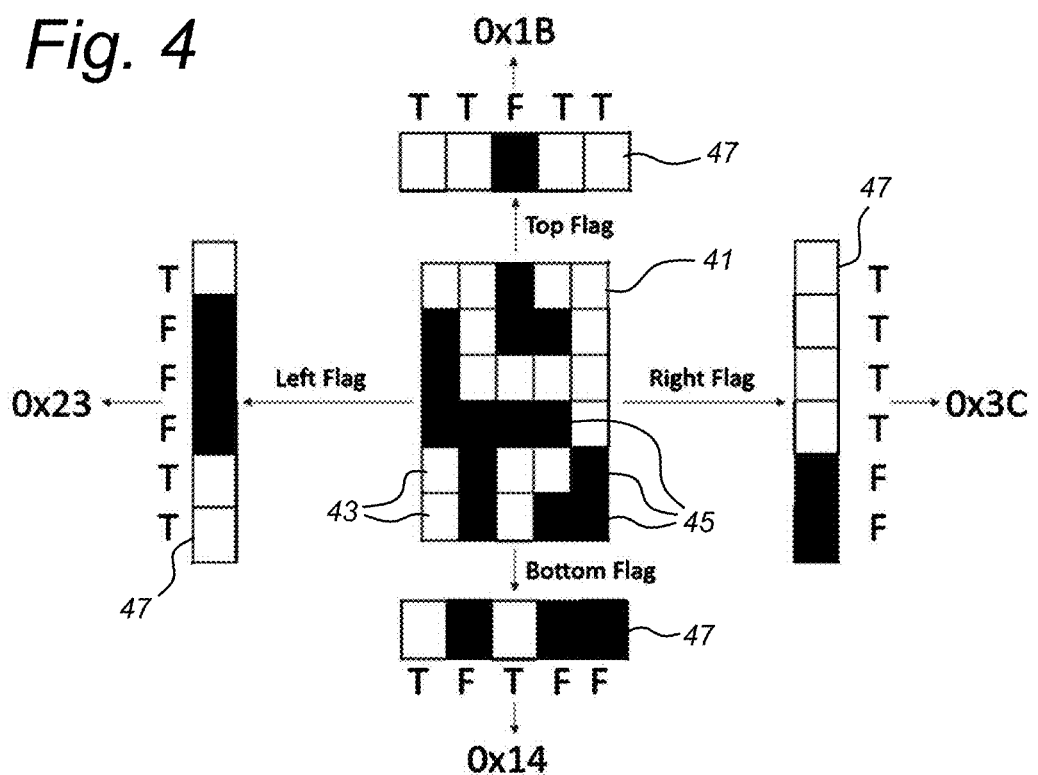
Figure 5:
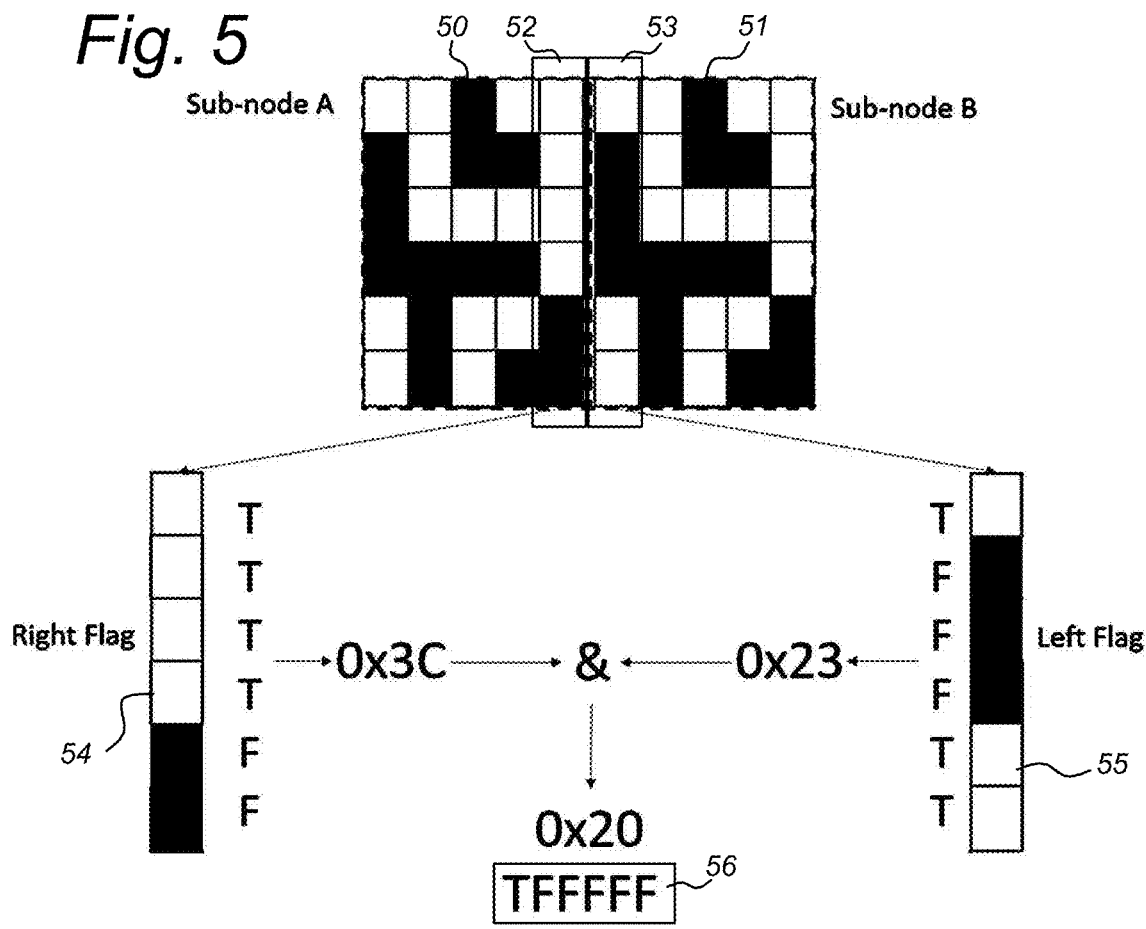
Figure 6A:
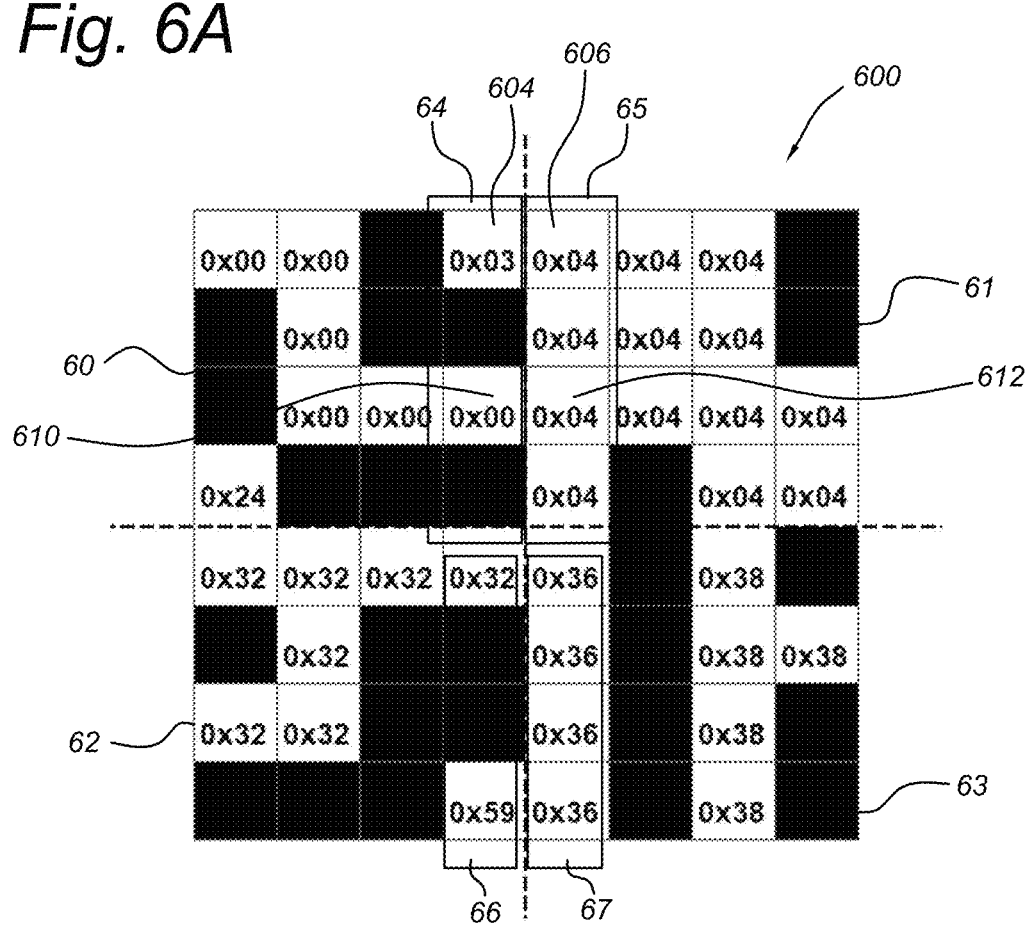
Figure 7:
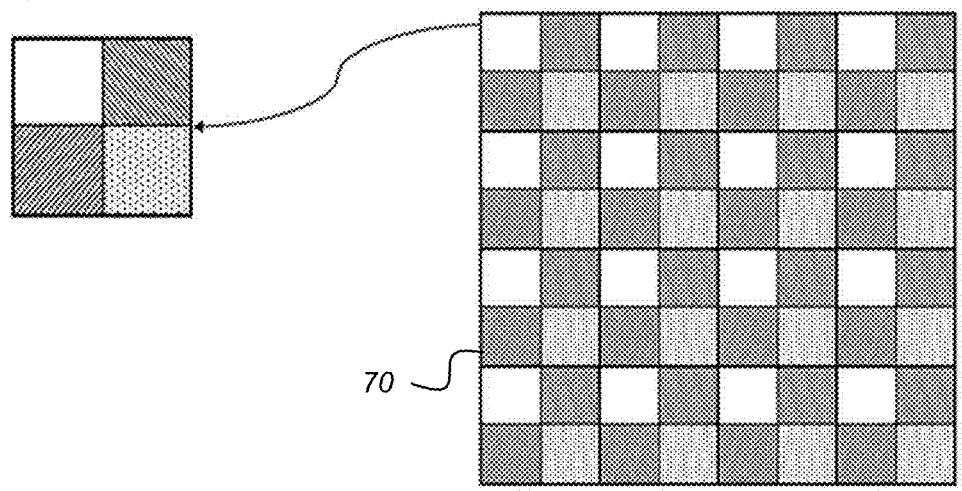
Figure 7:
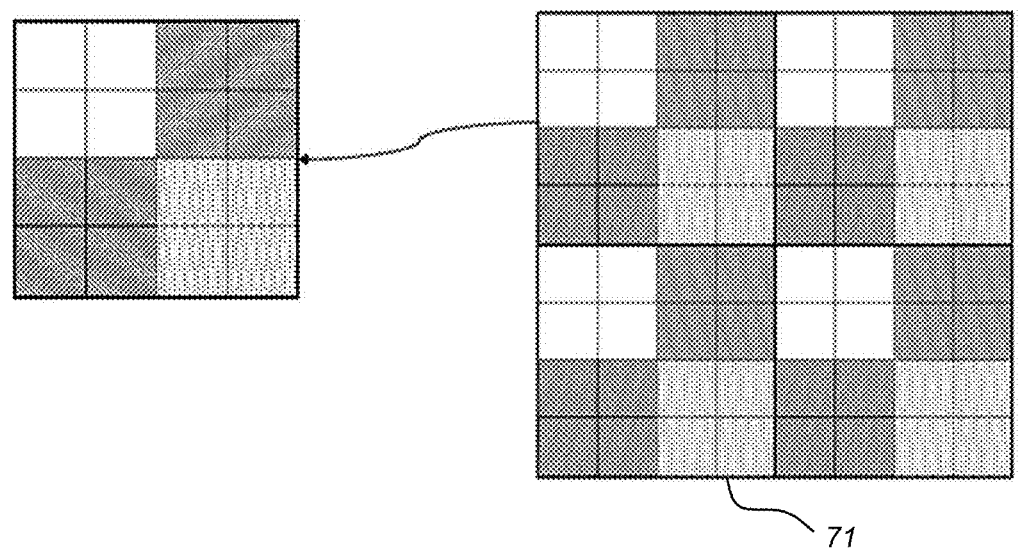
Figure 7:
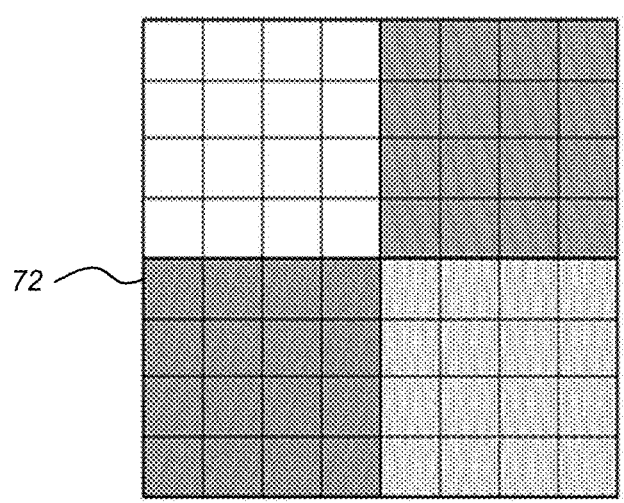
Figure 8:
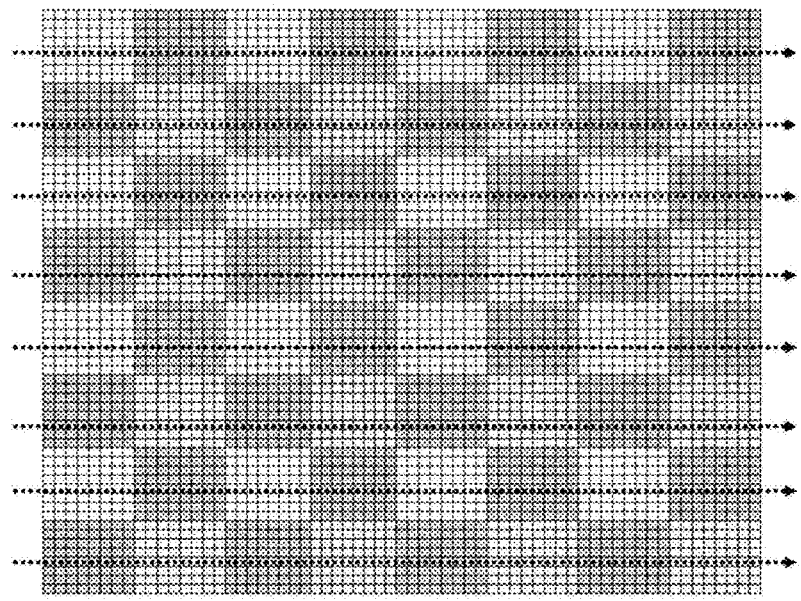
Figure 9:
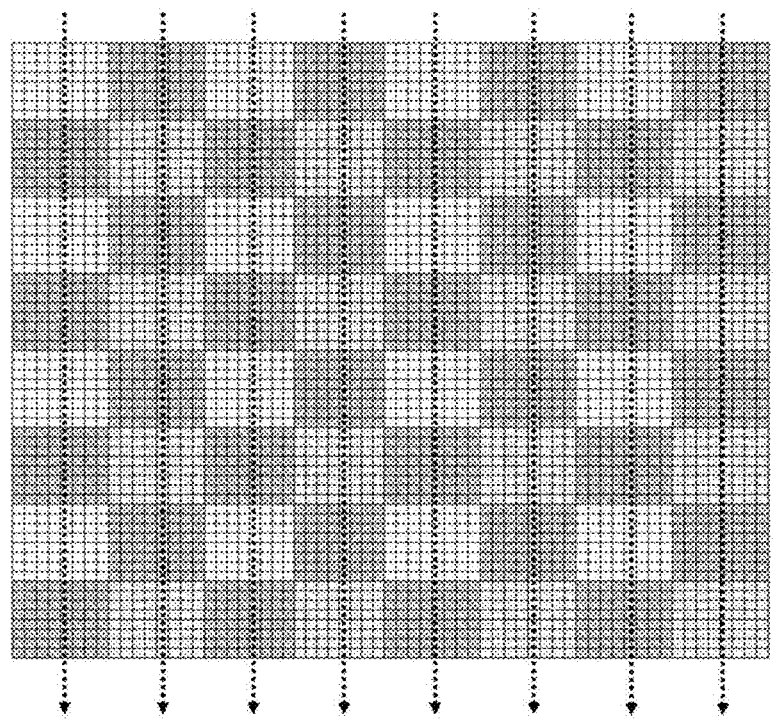
Figure 10:
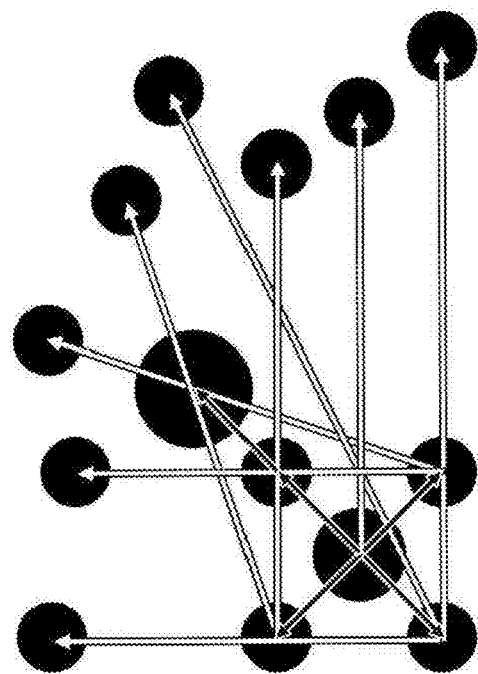
Figure 11:
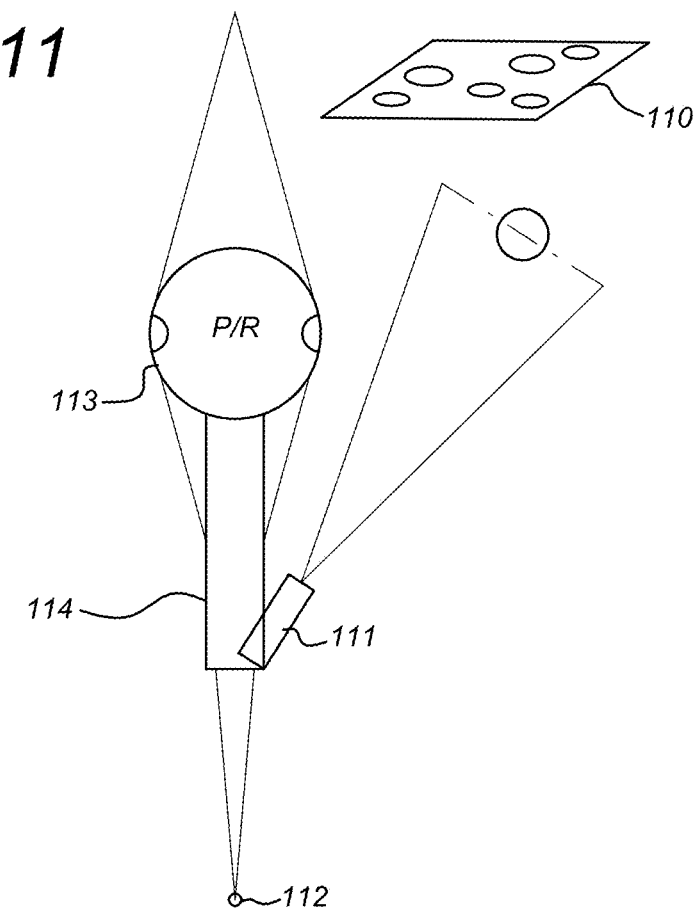
Figure 12:
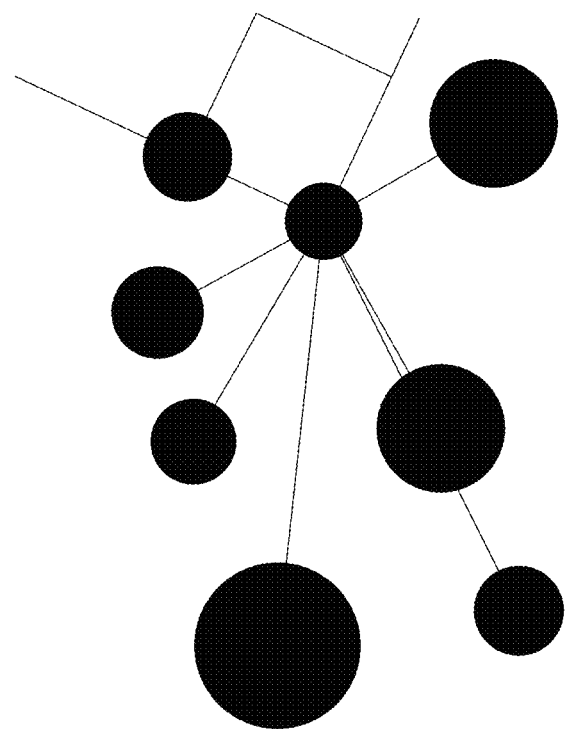

For the purpose of determining the extent of protection conferred by the claims of this document, due account shall be taken of any element which is equivalent to an element specified in the claims. The present invention will be discussed in more detail below, with reference to the attached drawings, in which:

FIG. 1 shows a schematic representation of a system for analyzing an image according to one embodiment of the present invention;

FIG. 2 shows an image divided in nodes and sub-nodes according to one embodiment of the invention;

FIG. 3A-3D depicts the initial labelling process of a sub-node of an image according to one embodiment of the invention;

FIG. 4 depicts the flag information of the sub-node shown in FIG. 3A-3D according to one embodiment of the invention;

FIG. 5 shows an example of how to use the flag information of two adjacent sub-nodes according to one embodiment of the invention;

Figures 6B, 6C:
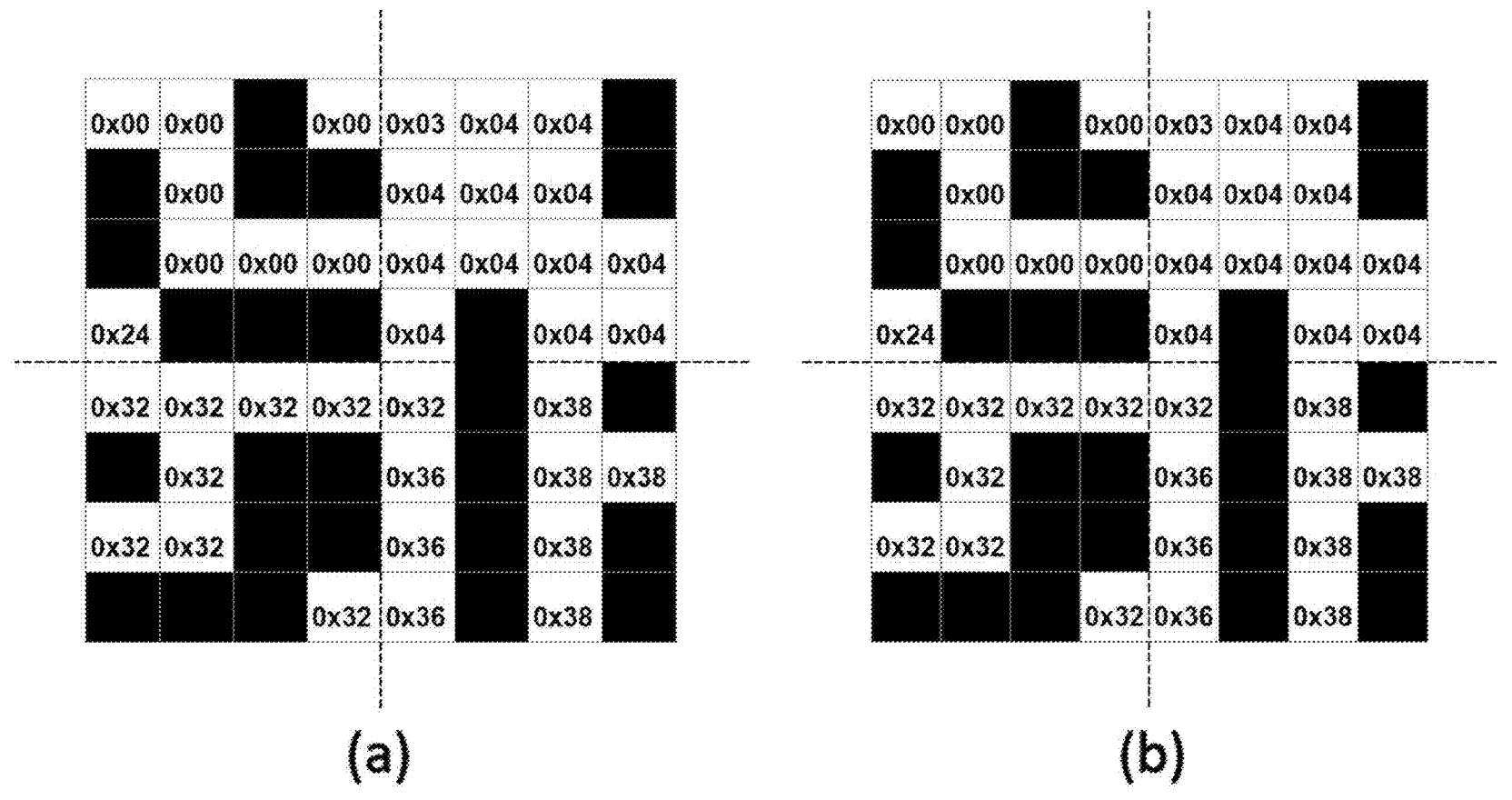

FIG. 6A', 6A-6J shows a tables of an example of the functioning of the system according to one embodiment of the invention;

FIG. 7 depicts a further merging process of a 16 and 64 sub-nodes that can be used in the present invention;

FIGS. 8 and 9 depict a stitching process that can be used in the present invention; and FIG. 10 shows a pattern that can be used in the present invention;

FIG. 11 shows a possible system applying the present invention;

FIG. 12 shows another semi randomly generated pattern that can be used in the present invention;

FIG. 13A represents a schematic of a system according to one embodiment of the invention.

Figure 13B:
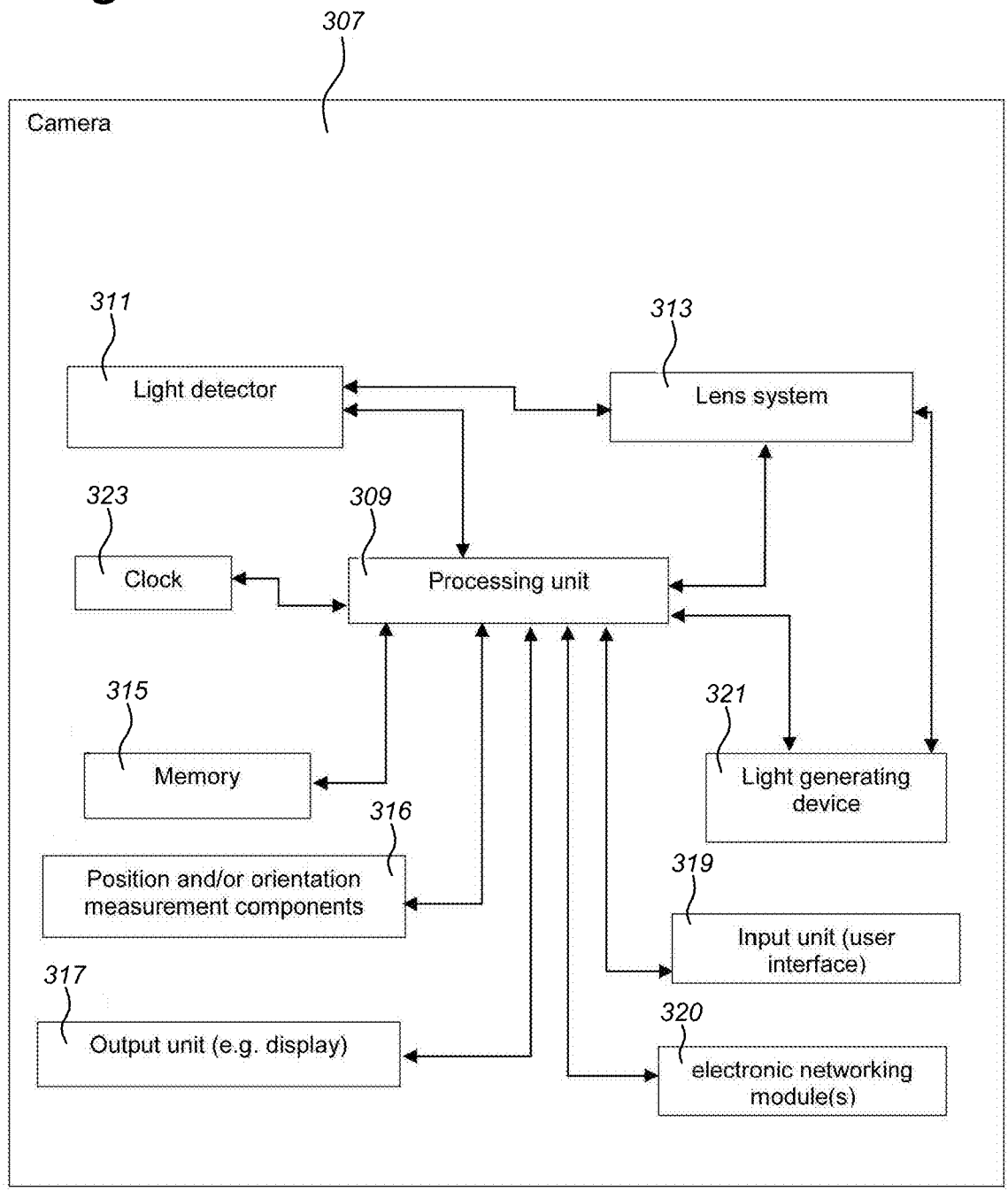

FIG. 13B shows an example of a camera according to an embodiment of the invention.

Figure 14:
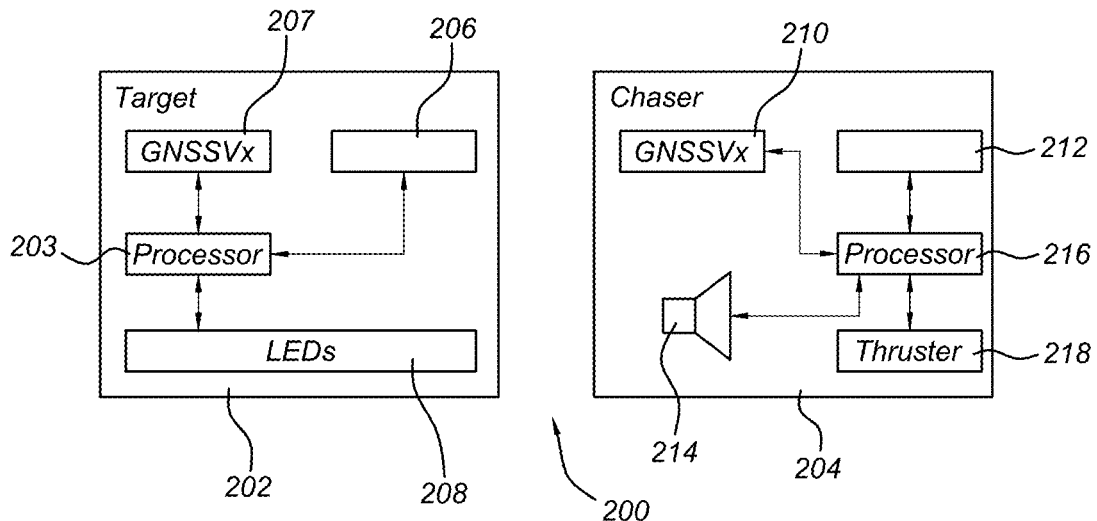

FIG. 14 represents a schematic of a system according to one embodiment of the invention.

Figure 15:
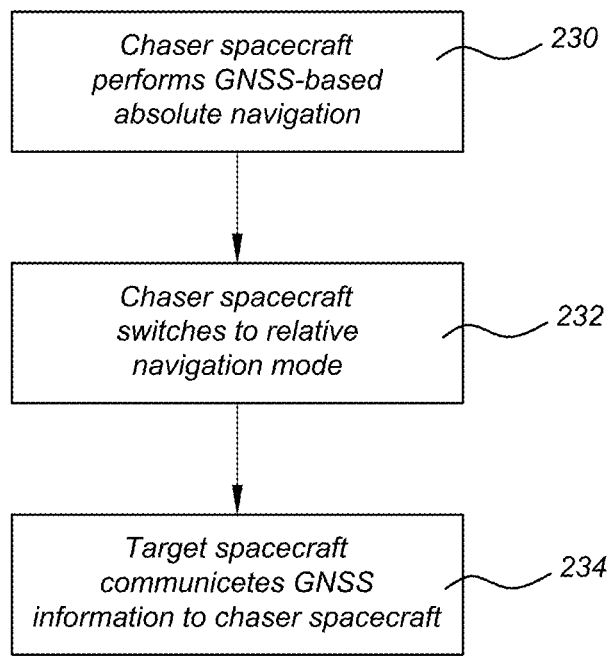

FIG. 15 shows a flow chart of a method for the system of FIG. 14.

DESCRIPTION OF EMBODIMENTS

The present invention provides a method and a device for analyzing an image for pattern identification. The invention also relates further to a method of and apparatus for performing tracking or positioning of an object based on a pattern in an image which pattern is fixed to that object. The invention also relates to a method of and an apparatus for allowing autonomous rendezvous and docking of two objects like two spacecrafts where one of the objects has a pattern fixed to it.

The pattern is a dot pattern like the ones shown FIGS. 10, 12 and 13. The patterns used have specific features as will be explained hereinafter. In general, an image of the dot pattern will be made by a camera having a suitable image sensor, e.g., a 2D sensor array. The image signal as generated by this sensor is output to a suitable processing system which processes the image signal in a way as defined hereinafter. A general setup of examples of such a camera with processing system is shown in and will be explained with reference to FIGS. 11, 13A, 13B, and 14. However, first an image processing example of the invention will be explained in detail.

FIG. 1 shows a schematic representation of a process for analyzing an image 1 according to one embodiment of the present invention. Here, the image 1 is the output signal of the image sensor in the camera not shown in FIG. 1. The image 1 comprises a plurality of elements. The image 1 may be a two dimensional (2D) image and the elements may be pixels. The image 1 may be a three dimensional (3D) image and the elements may be voxels. For the sake of simplicity, an image comprising pixels will be considered in the rest of the description. However, examples and embodiments explained with relation to pixels could be applied to a 3D image comprising voxels. First and as shown in FIG. 1, the image 1 is filtered in order to decrease the intensity variations among pixels of the image which are located next to each other. In this way, the image noise may be reduced. The filtering operation 2 may be implemented with a low pass filter acting in the image domain wherein the intensity of each pixel is defined based on the intensity of a neighbour pixel, wherein the neighbour pixel is located in the image next to said pixel. The filtering operation 2 may be performed using a Gaussian filter, for example. This provides a simple implementation wherein the complexity is independent of the number of pixels of the image. This provides also an advantage for implementing the filtering step in a General Purpose Unit (GPU) pipeline, because the execution time of the filtering operation is constant and every pixel can be computed individually.

After performing the filtering operation 2, an adaptive threshold operation 3 is be applied, resulting in a binary image.

After the adaptive threshold operation 3, the connected candidate pixels will be connected and labelled. Connected pixels within this context, are pixels different than above threshold which are neighbours in one of the 4 directions (north, south, west, east). The same algorithm could be extended to contemplate 8 directions, (north, south, west, east, northwest, northeast, southwest and southeast). Connected component labelling (CCL) is a known problem of unpredictable complexity and can be classified as Nondeterministic Polynomial time-complete (NP-complete). The difficulty in performing CCL relies on the fact that pixels in an image can present a variety of sizes and shapes in many possible combinations. Every pixel in the image needs to be checked multiple times in order to ensure that the right shape has been identified regardless its scale or projection in the image plane. When a relation of connectivity has been established between two neighbour pixels, those two neighbour pixels will receive the same label.

A "divide and conquer" strategy is employed to divide the image domain into smaller quadrants, called nodes or groups. These nodes can be processed in parallel. After each group is processed, it is merged together with other neighbour groups. This process is repeated iteratively until every node has been checked against all its neighbour nodes. In order to process the nodes in parallel, the data structures that hold the labels of the pixels contained in the nodes are organized such that memory conflicts are prevented.

Initially, the coordinates of every pixel of the image are divided based on the number of blocks and threads that will be processed in parallel. The coordinates of a node are calculated according to the incremental steps of this division, and each node is assigned to a different block in the Split Lv1 operation 4 of FIG. 1. The algorithm can be adapted to different GPUs by varying the number of nodes based on the available number of GPUs cores.

The algorithm proceeds as follows. First, all the pixels of a node will be processed one by one until a true pixel is found, or until all the pixels of that node have been processed without finding any true pixel. A true pixel may be a pixel wherein the light intensity or any other suitable parameter is above a determined threshold. And a false pixel may be a pixel wherein the light intensity or any other of suitable parameter is below a determined threshold. In operation Split Lv2 5, if there are only false pixels in the node, the node will be labelled as false and the execution of the core which is processing this node will be finished. If there is at least one true pixel in the node, the node will be divided in sub-nodes by dividing each spatial dimension of the node by an integer n (the integer n may be, for instance, 8). Each of these sub-nodes will be processed in the same way for finding true pixels. Each of the sub-nodes may be dispatched in another core with n×m threads.

Every sub-node may be processed in a different kernel. On the present document, kernel refers to a programming function that is written to be executed on a core of a GPU. On this kernel, if there are only false pixels in a sub-node, the sub-node is considered as false and the thread is finished. If there is at least one true pixel in the sub-node, a different operation to label the pixels is performed in the sub-node. A group is each of the nodes or sub-nodes produced by dividing an image as it has been described and each group comprises a plurality of elements which may be pixels, if the image is a 2D image, or voxels, if the image is a 3D image.

The operation for labelling the pixels of a sub-node is as follows. The labels assigned to every pixel will be stored in a table or matrix called map image. This table has the same dimensions as the original image. First, an initial labelling 6 will be performed. All pixels of the sub-node will be processed from, for instance, top left corner until bottom right corner. Other combinations and order of processing the pixels of a sub-node are possible. For instance, the pixels may be processed from bottom right corner until top left corner or in any other suitable order. When every pixel in a row is processed, the pixels of the next row will be processed until the last row is reached. If a pixel is true, and there is no other neighbour true pixel on the left or top of the pixel (left pixel is checked first, than top pixel is checked) within the sub-node, the pixel receives a numerical value as its label. On the other hand, if there is a true pixel inside the sub-node on its left or top that has already been labelled, the pixel will receive the same label as this already labelled pixel. Therefore, neighbour pixels will share the same label.

The label assigned to a pixel may represent an address of the element of the matrix by using the image stride. A label may be stored in a memory position, for instance as a 32 bit integer. Although any suitable kind of labels may be used, as an advantageous example this memory position (for instance a 32 bit integer variable) may be interpreted as a pair of two short integer variables (for instance, as a pair of two 16 bit integer). The first short integer may represent the row of the pixel and the second short integer may represent the column of the pixel. On this manner, the label can be used to index elements in the map, by applying, for instance, the following equation:

$$label = index_{row} * image_{stride} + index_{column}$$

$$label_{map}(row, column) = label$$

After this step, a second labelling process 9 is applied. This second labelling process 9 may be similar to the initial labelling process 6 except that instead of processing the pixels in the same order (for instance, starting at the top left corner and finishing at the bottom right corner) as in the initial labelling process 6, the pixels will be processed in another order (for instance, starting at the bottom-right corner and finishing at the top-left corner. During this second labelling process 9, the label of a pixel will be compared with the label of a neighbour pixel and, if the labels are different, the label with the smaller value may be attributed to the label with the bigger value of both labels or vice versa. As a label has been assigned to every pixel during the initial labelling process, it is not necessary to assign new labels. Thus, the objective of the second labelling process 9 is to check if there are neighbour pixels that do not share the same label. A counter may be incremented each time that the label of a pixel is changed inside of the sub-node. If inside of a sub-node there is no pixel which label has been changed during this second labelling process, the execution of the kernel for that sub-node will be ended.

When the second labelling process 9 is finished, a third labelling process 10 is performed. Again, this third labelling process 10 is similar to the second labelling process 9, but this time the pixels will be processed in the same order as in the initial labelling 6. However, as in the second labelling process 9, only pre-existing labels will be assigned. I.e., no new labels will be created during the third labelling process. The second labelling process 9 and/or the third labelling 10 may be repeated until no label change is found, or up to a limited number of iterations. This is checked in step 8. For instance, shapes as spirals may need many iterations to be properly labelled. On the other hand, shapes like dots, generally, may be labelled after one or two iterations. This also depends on the number of pixels of the sub-node.

When no label change is found or a number of iterations has been reached, the process in FIG. 1 proceeds to step 11 wherein the label map may be copied to a reference map. I.e., at this stage, the label map and the reference map are identical.

The initial, the second and the third labelling processes will be performed independently for every sub-node. In view of this, the initial, the second and the third labelling processes are inherently parallelizable.

For each of the sub-nodes, 4 neighbourhood directions are defined. These 4 neighbourhood directions are the 4 directions in which each sub-node is delimited by other sub-nodes. In step 7, each one of the four neighbourhood directions of each sub-node will be assigned a numerical flag wherein the numerical flag represents the true and false values of the pixels of that sub-node that are neighbours to the pixels of another sub-node, which is delimiting that sub-node in that direction. These numerical flags will be used for further processing of the sub-nodes in later stages. FIG. 4 shows a sub-node 41 wherein the white quadrants 43 represent pixels with a true value and the black quadrants 45 represent pixels with a false value. FIG. 4 also shows the numerical flags 47 to the four directions of the sub-node 41. As it can be seen in FIG. 4, each of the numerical flags represent the true and false values of the edge pixels that can be used in the present invention, i.e. the pixels of the sub-node 41 that are neighbours to pixels of other sub-nodes (not shown in FIG. 4). On this stage all the sub-nodes inside a group will be processed. The numerical flags will be used to optimize this process, as will be explained with reference to FIG. 5.

FIG. 5 shows a first sub-node 50 and a second sub-node 51 wherein the first subgroup 50 and the second sub-node 51 are neighbour sub-nodes. I.e., the first sub-node 50 comprises pixels 52 which are adjacent to pixels 53 of the second sub-node 51. FIG. 5 shows furthermore a first numerical flag 54 assigned to pixels 52 of the sub-node 50 in the direction of the sub-node 51 and a second numerical flag 55 assigned to pixels 53 of the sub-node 51 in the direction of the sub-node 50. The first numerical flag 54 represents the true and false values of pixels 52 while the second numerical flag 55 represents the true and false values of pixels 53. The result 56 of a logic And operation between the first numerical flag 54 and the second numerical flag 55 shows the neighbourhood relations between the pixels 52 and the pixels 53. I.e., the result 56 will contain a true value in positions corresponding to positions in pixels 52 containing a true pixel neighbour to another true pixel of the pixels 53 and the result 56 will contain a false value in any other position. As can be seen, the numerical flags allow to verify the neighbourhood relations among sub-nodes using less operations than if each pixel in a sub-node which is neighbour to a pixel in a different sub-node was processed individually. Furthermore, the result of the logical AND operation also indicates the position of the pixels wherein the neighbourhood condition happens. The checking is initiated from the position corresponding to the most significant bit until the position of the least significant bit.

This numerical flags may be used in the merge processes of steps 12, 13 and/or 14 in FIG. 1. FIGS. 6A-6G show schematic representations of the merging process for merging an arrangement of two by two neighbour sub-nodes. When the sub-nodes are merged, for the corresponding pixels, a label map and a reference map for each sub-node will be updated using the following MergePixels algorithm:

```
MergePixels (pixelA, pixelB)
    reference_pixelA = label_map(label_map(pixelA)))
    reference_pixelB = label_map (label_map (pixelB)))
    label_pixelA = reference_map(reference_pixelA)
    label_pixelB = reference_map(reference_pixelB)
    if(label_pixelA != label_pixelB)
        if(label_pixelA < label_pixelB)
            label_pixelB = labelpixelA
            reference_pixelB = label_pixelA
        else
            label_pixelA = label_pixelB
            reference_pixelA = label_pixelB
End
```

During a merge operation, the labels and reference labels for each pixel are read from the corresponding label map and reference map. The labels and reference labels of each pixel are compared and, if they are different, the pixel which has the label with the greater value will have its label and reference label updated with the value of the label of the other pixel.

An example of this merging operation will be now explained with reference to FIGS. 6A-6J. In this example, each node has 4 sub-nodes, distributed in 8 rows and 8 columns. In this example the memory position will be interpreted as a pair of two octal integer variables. The content of the pixels in table 6A-6J can be interpreted in two ways. In a first one, said content can be seen as a first octal integer representing the row of the pixel and a second octal integer representing the column of the pixel. In a second way, the content is a decimal value interpreting these two octal integers as a one integer. In the beginning of the sub-node merging operation, arrangements of two by two sub-nodes will be treated individually. FIG. 6A shows a high-right sub-node 60, a high-left sub-node 61, a low-right sub-node 62 and a low-left sub-node 63 adjacent to each other. The pixels of each of the sub-nodes have already been labelled. A merging operation of the four sub-nodes will be performed now.

The merging operation is composed of 4 steps:

First step: The first step starts from the top-left sub-node 60. When performing this step, the numerical flags of neighbour pixels that belong to different sub-nodes will be checked as explained before with reference to FIG. 5. The sub-nodes will be merged first from left to right. First, a logic AND operation is performed between the numerical flag of pixels 64 in the sub-node 60 and the numerical flag of pixels 65. After that, a logic AND operation is performed between the numerical flag of pixels 66 in the sub-node 62 and the numerical flag of pixels 67 in the sub-node 63. FIGS. 6B and 6C show respectively the label map and the reference map after this first step has been applied.

Figures 6D, 6E:
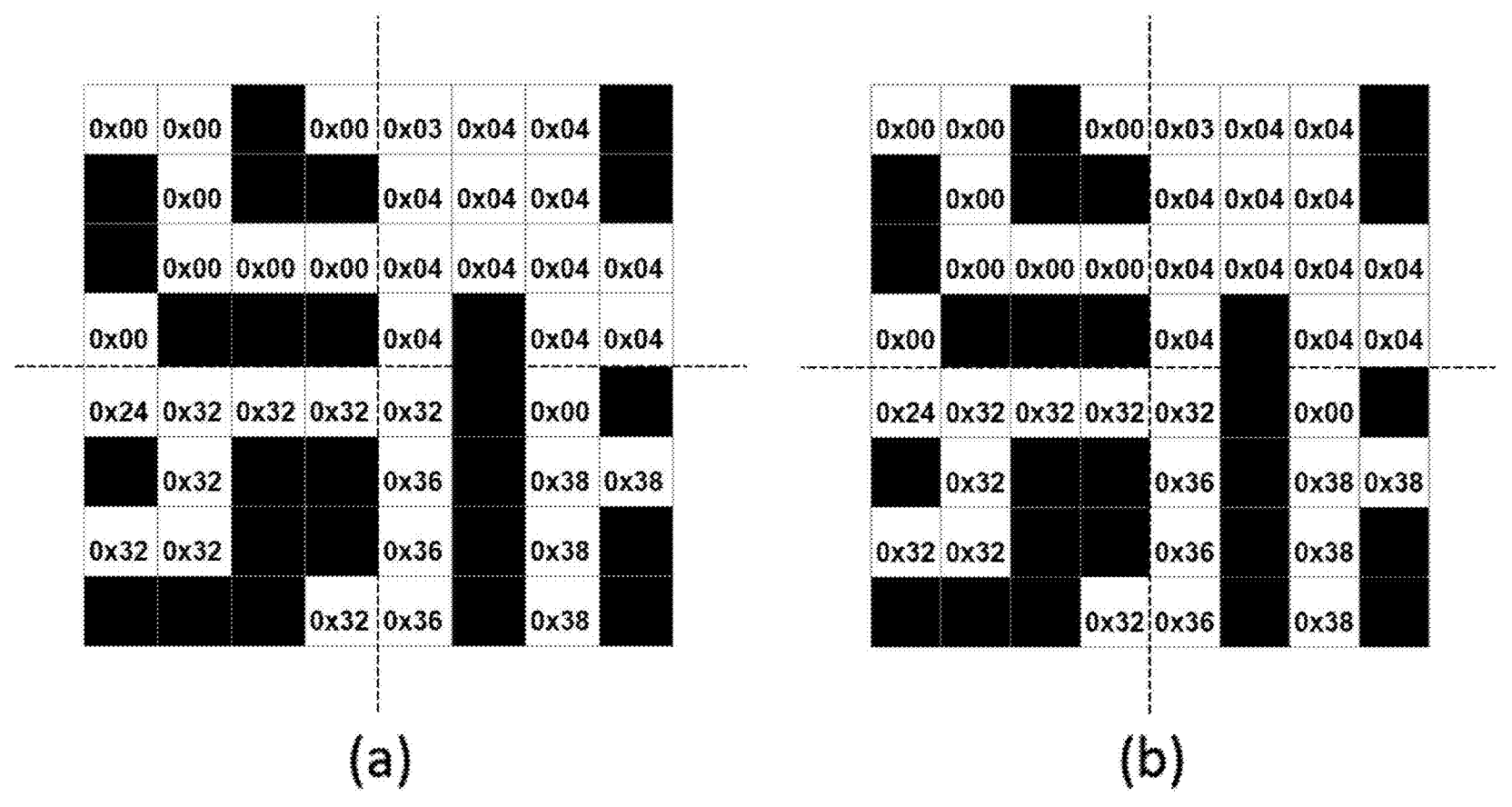

Second step: The second step starts from the top-left sub-node but this time the sub-nodes will be merged first from top to bottom. As in the first step, the numerical flags of neighbour pixels that belong to different sub-nodes will be checked and the sub-nodes will be merged. First, a logic AND operation is performed between the numerical flag of pixels in the bottom-left sub-node and the numerical flag of pixels in the top-left sub-node. After that, a logic AND operation is performed between the numerical flag of pixels in the bottom-right sub-node and the numerical flag of pixels in the high-right sub-node. FIGS. 6D and 6E show respectively the label map and the reference map after this second step has been applied.

Figures 6F, 6G:
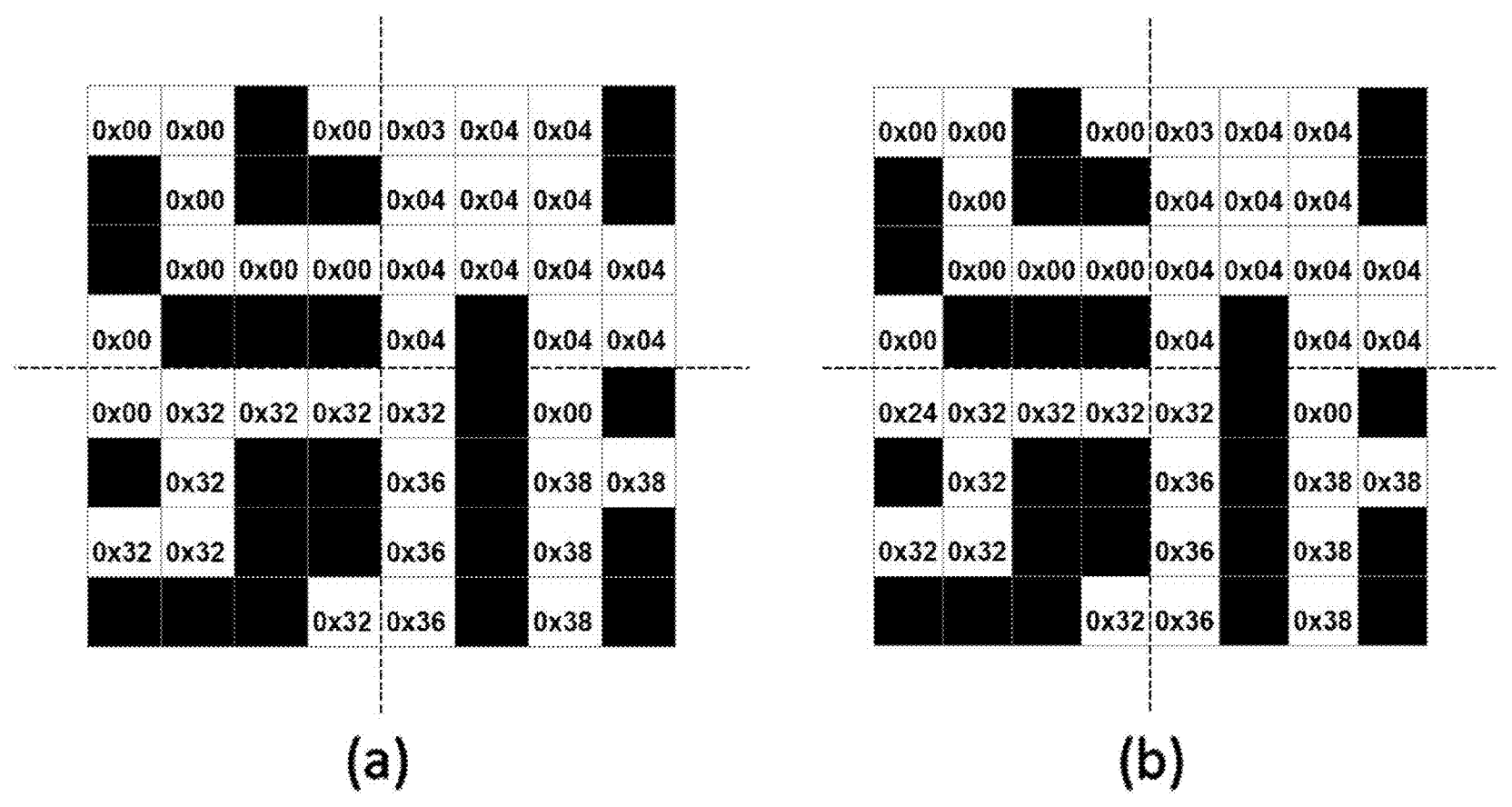

Third step: In the third step the sub-nodes will be merged from right to left. First, a logic AND operation is performed between the numerical flag of pixels in the top-right sub-node and the numerical flag of pixels in the bottom-right sub-node. After that, a logic AND operation is performed between the numerical flag of pixels in the top-left sub-node and the numerical flag of pixels in the bottom-left sub-node. FIGS. 6F and 6G show respectively the label map and the reference map after this second step has been applied.

Figures 6H, 6I:
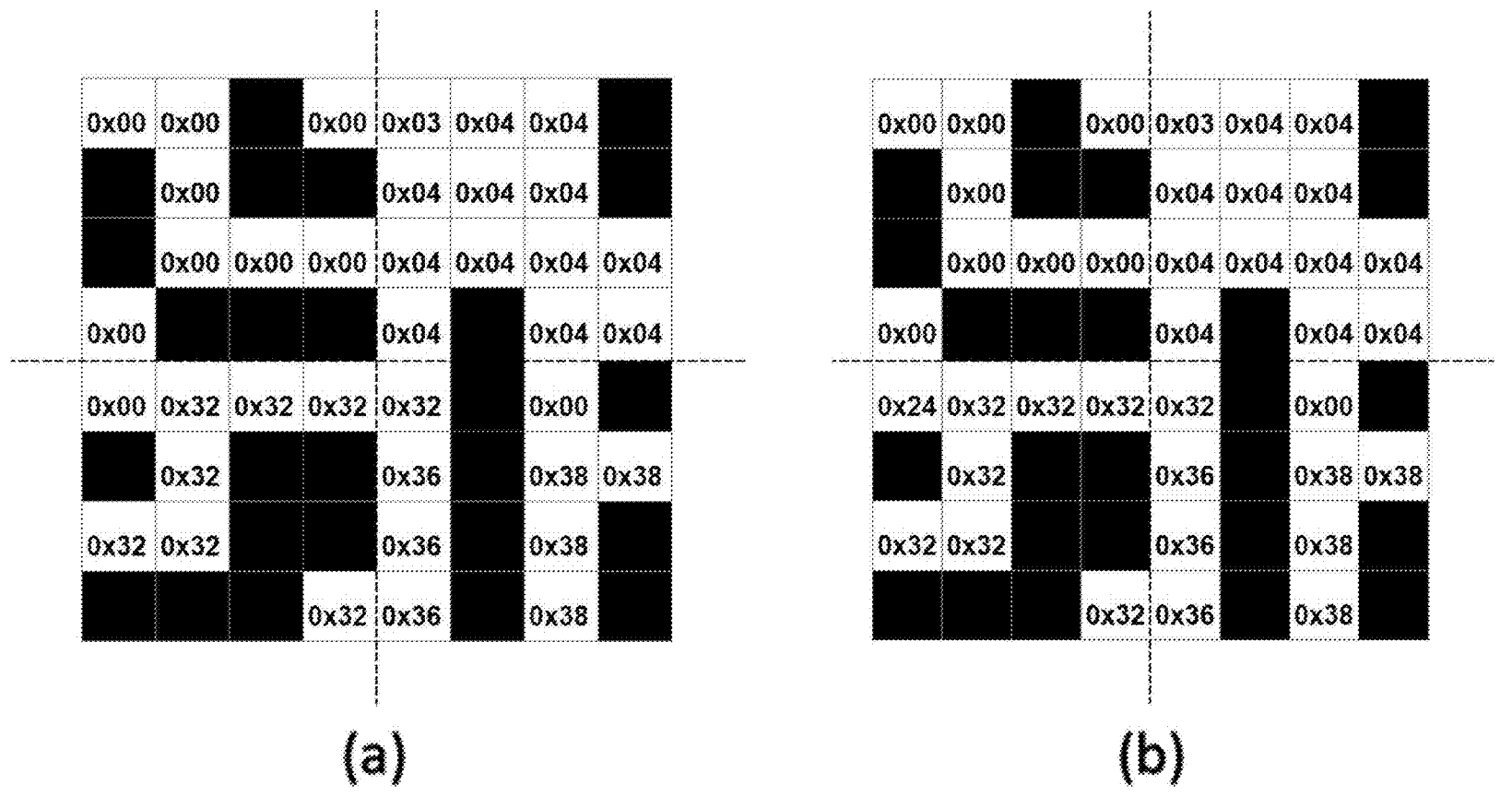
Figure 6J:
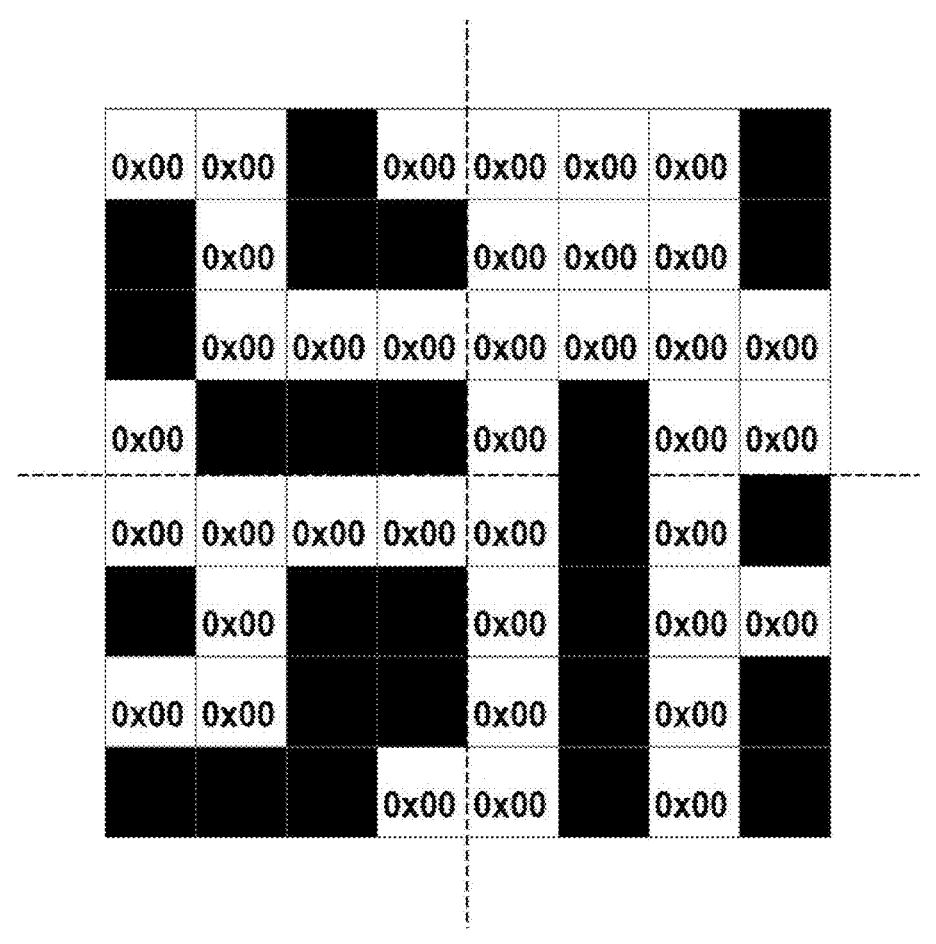

Fourth step: Finally, in the fourth step the sub-nodes will be merged from bottom to top. FIGS. 6H and 6I show respectively the label map and the reference map after this second step has been applied.

An example of how to apply the merging algorithm "MergePixels (pixel A, pixel B)" during the merging operation will be explained in detail now.

The image map 600 of four sub-nodes in FIG. 6A has their rows and columns indexed from 0 to 7 as represented in FIG. 6A'. The reference map corresponding to the image map 600 is identical to said image map 600 and therefore will not be shown. Pixel 604 (which will be pixel A) in row 0, column 3 and pixel 606 (which will be pixel B) in row 0, column 4 will be merged.

The first step of the algorithm requires the calculation of $label_{map}$(pixelA). PixelA in this case is considered as the row and the column of pixel A in the image map 600. I.e., for pixel 604, pixelA is row 0, column 3 and $label_{map}$(pixelA) will give back the value stored in row 0 and column 3 of the image map 600 interpreted as column and row. In this case, $label_{map}$(pixel 604) will give back the value ox03 (that's the value stored in table 600 in row 0 and column 3) interpreted as row 0 and column 3. In view of this, the operation $label_{map}(label_{map}$(pixelA)) will give back the value stored in row 0 and column 3 of the image map 600. In this case, $label_{map}$(ox03) will give back the value ox03 (that's the value stored in table 600 in row 0 and column 3). I.e., the first step of the algorithm $reference_{pixelA}=label_{map}(label_{map}$(pixelA))) gives then the result ox03.

The second step of the algorithm requires the calculation of $label_{map}$(pixelB). PixelB in this case is considered as the row and the column of pixel B in the image map 600. I.e., for pixel 606, pixelB is row 0, column 4 and $label_{map}$(pixelB) will give back the value stored in row 0 and column 4 of the image map 600 interpreted as column and row. In this case, $label_{map}$(pixel 606) will give back the value ox04 (that's the value stored in table 600 in row 0 and column 4) interpreted as row 0 and column 4. In view of this, the operation $label_{map}(label_{map}$(pixelB)) will give back the value stored in row 0 and column 4 of the image map 600. In this case, $label_{map}$(ox04) will give back the value ox04 (that's the value stored in table 600 in row 0 and column 4). I.e., the second step of the algorithm $reference_{pixelB}=label_{map}(label_{map}$(pixelB))) gives then the result ox04.

The third step of the algorithm calculates $label_{pixelA}=reference_{map}(reference_{pixelA})$ what means that, as $reference_{pixelA}$ has a ox03, then $label_{pixelA}=reference_{map}$(ox03) will give back the value that is found in row 0, column 3 of the reference map which is a ox03.

In the fourth step, the algorithm calculates $label_{pixelB}=reference_{map}(reference_{pixelB})$ what means that, as $reference_{pixelB}$ has a ox04, then $label_{pixelA}=reference_{map}$(ox04) will give back the value that is found in row 0, column 4 of the reference map which is a ox04.

In the fifth step, $label_{pixelA}$ as a value will be compared to $label_{pixelB}$ as a value and, if one of them is smaller than the other, the image map 600 and the reference map will be updated. In this case, the value ox04 and the value ox03 will be compared. As the value 0x03 is smaller, the following update will take place. Row 0, column 4 of the image map 600 and the reference map will be update with a ox03 as it can be seen in FIGS. 6B and 6C.

After that, the merging process will continue by applying the merging algorithm "MergePixels (pixel A, pixel B)" to pixel 610 (which will be pixel A) in row 2, column 3 and pixel 612 (which will be pixel B) in row 2, column 4 will be merged. $Label_{map}$(pixelA) will give back the value stored in row 2 and column 3 of the image map 600 interpreted as column and row. In this case, $label_{map}$(pixel 610) will give back the value ox00 (that's the value stored in table 600 in row 2 and column 3), which will be interpreted as row 0 and column 0 for the next operation of the algorithm. In view of this, the operation $label_{map}(label_{map}$(pixelA)) will give back the value stored in row 0 and column 0 of the image map 600 which is a 0x00. I.e., the first step of the algorithm $reference_{pixelA}=label_{map}(label_{map}$(pixelA))) gives then the result ox00.

The second step of the algorithm requires the calculation of $label_{map}$(pixelB). PixelB in this case is considered as the row and the column of pixel B in the image map 600. I.e., for pixel 612, pixelB is row 2, column 4 and $label_{map}$(pixelB) will give back the value stored in row 2 and column 4 of the image map 600 interpreted as column and row. In this case, $label_{map}$(pixel 612) will give back the value ox04 (that's the value stored in table 600 in row 2 and column 4) which will be interpreted as row 0 and column 4 in this step.

In view of this, the operation $label_{map}(label_{map}(pixelB))$ will give back the value stored in row 0 and column 4 of the image map 600. In this case, $label_{map}(\text{ox}04)$ will give back the value ox03 (that's the value stored in table 600 in row 0 and column 4). I.e., the second step of the algorithm $reference_{pixelB}=label_{map}(label_{map}(pixelB)))$ gives then the result ox03.

The third step of the algorithm calculates $label_{pixelA}=reference_{map}(reference_{pixelA})$ what means that, as $reference_{pixelA}$ has a ox00, then $label_{pixelA}=reference_{map}$ (ox00) will give back the value that is found in row 0, column 0 of the reference map which is a ox00.

In the fourth step, the algorithm calculates $label_{pixelB}=reference_{map}(reference_{pixelB})$ what means that, as $reference_{pixelB}$ has a ox03, then $label_{pixelA}=reference_{map}$ (ox03) will give back the value that is found in row 0, column 3 of the reference map which is a ox03.

In the fifth step, $label_{pixelA}$ as a value will be compared to $label_{pixelB}$ as a value and, if one of them is smaller than the other, the image map 600 and the reference map will be updated. In this case, the value ox00 and the value ox03 will be compared. As the value 0x00 is smaller, the following update will take place. Row 0, column 3 of the image map 600 and the reference map will be update with value ox00 as it can be seen in FIGS. 6B and 6C.

After all four sub-nodes in FIG. 6A have been merged following the above four steps merging operation, the same four step merging operation will be applied, but now among sets of four neighbour sub-nodes, if all the sub-nodes of those sets have already been merged. Later on, the four step merging operation will be repeated, but merging sets of four sets of four sub-nodes. A visualization of this iterative process can be seen in FIG. 7 wherein map 70 represents the different 2×2 sub-nodes, map 71 represents the different 4×4 sub-nodes and map 72 represents the final result.

Each merging operation is independent from any other operation, and therefore parallelizable. However, for analysing an image with a pattern in which dots need to be identified, another approach, less complex than the above iterative merging of sub-nodes approach, may be applied. This approach will consist in applying first a stitching columns operation. The stitching columns operation aims to merge sub-nodes by processing adjacent columns from left to right. FIG. 8 shows with arrows the direction in which the processing is performed. Each adjacent column can be processed individually. Therefore, the operation is parallelizable. Every time a neighbouring condition is found, the label map and the reference map are updated according the MergePixels algorithm that has been previously presented.

After applying the stitching columns operation, a stitching rows operation will be performed. The stitching rows operation is similar to the stitching columns operation, but it will process adjacent rows from top to bottom. FIG. 9 shows with arrows the direction in which the processing is performed. Each adjacent column can be processed individually. Therefore, the operation is parallelizable. Every time a neighbouring condition is found, the label map and the reference map are updated according the MergePixels algorithm that has been previously presented.

Following the stitching columns operation, an updating map operation 16, cf. FIG. 1, will be performed. In this stage, the labels of the sub-nodes updated in the stitching steps are rechecked in order to verify if the maps should be updated. This is done in four steps. Initially, all columns are processed from left to right, then all rows are processed from top to bottom, then all columns are processed from right to left and finally, all rows are processed from bottom to top. However, any other suitable order may be followed.

At the end of this updating maps operation, the label for every pixel has been assigned by applying the above explained labelling equation, and the labelled pixels are stored as a new image 17 which is a version of the original image 1 in which all connected pixels of the image will have an individual label.

All these steps can be performed in a parallel computing architecture using the minimum of interdependence among the parts of the input data. The divide and conquer approach and the design decision in handling the memory allowed to construct data structures which could be manipulated in parallel, regardless the reading order of the elements in the same block. The only operation for which the number of iterations is unknown a priori, since it depends on the characteristics of the input data, is the loop in the sub-node labelling. However, the smaller the size of nodes in pixels, the more predictable this loop becomes, since the number of possible label variations decreases and therefore less iterations would be needed.

After this, a classification of connected pixels will be performed. At this point all pixels are properly merged, however it is still unknown which pixels belong to groups of labels that can be classified as a blob. A blob is a dot candidate. I.e., a blob is a group of pixels which seem to correspond to one of the dots in the pattern. This step aim is to refine the groups and remove false positives considerably. The steps in this section may rely on functional programming to handle operations in parallel. Most of the operations can be lambda-calculus applied to container-like data structures. The Cuda-Thrust library may be used to write the algorithms which use functional programming, since this library provides implicitly parallelization.

This is followed by a transformation of the image to a 1D map of labelled pixels. A hashMap is built wherein the key value is the pixel label and the data is the pixel 2D coordinate. Initially the map is filtered to remove every key equal to zero, i.e. pixels that have not been labelled. The second step is to sort all keys such that pixels that belong to the same group will be positioned contiguously in the map. A group is a set of pixels having the same label. The order of the pixels 2D coordinate is not relevant at this moment, and they can be arranged in any order as long the keys are properly sorted.

In the sorted hashMap, a reduction by key operation is performed to obtain the geometrical characteristics of each group. A reduction by key searches the hashMap for adjacent pixels complying a binary predicate, for every pair of pixels complying with the binary predicate, another operation will be performed. The operation to be performed on the keys is expressed as a binary functor, which can receive a pair of iterators related to the adjacent pair of pixels.

The used binary predicate simply checks if the key of adjacent key pairs are equal. As long as they are equal, the geometric characteristics of the group will be calculated.

The binary functor receives the adjacent pair of data associated with keys checked by the binary predicate, performs a set of instructions and outputs another single element of the same type of the components of the pair of data. If the next binary predicate is true, the output will be used the next time the binary functor is invoked alongside with the data iterator associated with adjacent key. If the next binary predicate is false, its iterator is returned and stored in a list of iterators. A new iterator will be stored in the list every time the binary predicate returns false. At the end of the reduction, there will be an output iterator for every group of unique key in the map.

As mentioned before, every time the binary functor is invoked, it receives an iterator containing the data associated with the key. It is possible to associate lists of data with the key, and therefore accumulating values that can change at every functor call. In order to accumulate geometrical information of the groups, associated lists can be used with the following attributions: store the minimum and maximal 2D coordinates of the group, count the number of pixels in each group, accumulate the 2D coordinates of each pixel. Therefore, when the reduction is done, there will be a list of iterators containing this information for every group.

After this, a transform reduction operation is applied. With the geometric characteristics at hand, it is possible to imply if the group corresponds to a blob or not. A blob may have similar width and height, present a reasonable ratio between number of pixels and bounding box area, and/or may need to present a minimum number of pixels to not be misled with noise. In order to refine the values obtained in the reduction, another reduction may be needed.

A design pattern known as Transform Iterator is employed to calculate the geometrical characteristics of the group, and a binary functor is employed to evaluate these characteristics. The advantage of using a Transform Iterator is that a transform is performed alongside the reduction, saving computational time.

The binary functor evaluates the geometric characteristics calculated in the transform. For instance, and although other geometric characteristics could be chosen, that the aspect ratio between width and height, or vice-versa, is at least 0.5. The number of pixels in the group may be at least 50% of the area of the bounding box of the group. However, the number of pixels maybe between any user defined value. For this example, the number of pixels should be between $area_{image}/(2^{15})$ and $area_{image}/(2^5)$ and the area of the bounding box should be between $area_{image}/(2^{14})$ and $area_{image}/(2^5)$. The groups that have passed the evaluation of the binary functor will be evaluated in the next step. Next, a pattern matching operation will be performed. At this stage the majority of false positive blobs have been discarded.

The objective is to identify if the blobs in the image correspond to dots in the pattern, this correspondence should also express the topology of the dots.

This stage is related to the geometrical characteristics of the dots in the pattern. The description of the pattern should be expressed in geometrical quantities that are invariant to scale and rotation. The dots are disposed in the pattern in a set of collinear arrangements in which the angle of the line is known. Therefore, regardless the position, scale or the orientation of the pattern in the image, the angular correlation of lines is constant. Among the dots in the pattern, there are 6 dots which represent crucial landmarks, these dots need to be identified in order to estimate the pattern properly. The remaining dots are not crucial for the pattern matching, their function in the pattern is to provide additional samples to improve robustness and reduce local measurement bias. FIG. 10 shows a pattern of dots with both crucial and non-crucial dots.

First, the crucial dots will be matched. The description of this step is as follows: The six crucial dots have a main dot orbited by four dots of the same size, each one is located in one of the four intercardinal directions and are equidistant with respect to the central dot. The sixth dot is 5/3 times large than the central dot and is positioned in the northwest direction, further than the orbiting dots. The novelty in performing this task relies on the manner that the data structures had to be built to allow this operation to be performed in a functional paradigm, and therefore to allow parallelization.

Even though the blobs have been filtered and are stored in the blob list, there is no guarantee that only the blobs which belong to the pattern of dots are in the image. There may exist other blobs belonging to any kind of visible object, which may not necessarily be the pattern. All these blobs need to be checked, since there is no prior knowledge if they belong to the pattern or not.

In order to identify the relation between the crucial dots, a map was built (FiveNearestNeighboursMap) in which the key is the position of each blob in the blob list. The data contains the pixel coordinate of the centre of gravity of the blob, and the coordinates of the centres of gravity, the distances and identifications, of its five nearest blobs, the structure of the data is called IndexDistanceFiveNeighbours. Regardless the orientation or scale of the pattern, a crucial dot will always be a main dot having five closest neighbours. The construction of this map is as follows.

In order to avoid calculating the distance of one dot to another twice, a triangular matrix was built to represent the distance matrix. Therefore, the result does not need to be recalculated in case the ids are presented in the alternate order. A transform is used to build the set of ordered pairs and a kernel is used to fill the distance in the triangular matrix, allowing parallelization.

Now, a reduction to the five nearest neighbour map will be performed. Given that the blob list has N blobs, another structure of size N×(N−1) is built to store the distance of each blob to the other. The id of each blob is the key and the data holds an IndexDistanceFiveNeighbours. The id of the first element in each data is valid and its distance corresponds to the value present in the distance matrix, the id of the remaining four elements is deliberately initialized invalid and the distance may be the maximum possible representation of a float value. The objective is to apply a reduction by key on this map, comparing adjacent values with a functor and storing in the output iterator only the smallest five indexes. Therefore all the comparisons can be done with a lambda-calculus operation allowing implicit parallelism and producing the FiveNearestNeighboursMap as outcome.

After this, a blob to dot matching is performed. A kernel has been written allowing to check each element of the FiveNearestNeighboursMap individually, and therefor in parallel. The kernel checks the characteristics mentioned above. If certain characteristics are found, the center of gravity of each blob is stored in a descriptor (vector of 2D coordinates) in its position with respect to its topology. Having found the crucial dots allows the estimation of the non-crucial dots. The example pattern has 13 dots, 6 crucial, 7 non-crucial. However, any other suitable pattern may be used with any other number of crucial and non-crucial dots. In order to find the remaining non-crucial dots, the 12 closest blobs to the main blob that have not been classified as crucial are selected. All these blobs have collinearity relations with the crucial dots. These relations are used to filter the dots among the candidates. The pattern pose can be estimated by using only the crucial dots, the non-crucial dots provide a less biased pose estimation. It is expected that at least 2 non-crucial dots are found.

An ellipse detection is applied as the next step. The center of gravity is a good indication that the center of a blob belongs to a dot of the pattern, but it is not an optimal indicator. This centre of gravity is found in the binary image, which is produced from the filtering process 2 followed by the adaptive threshold step 3. When a dot is seen in perspective, it has the shape of an ellipse, despite the fact it is a circle. Therefore, the center of this ellipse in the original image is considered the optimal representation of the center of the dot.

In order to estimate the center of each ellipse, a ray casting approach was employed. Radial rays are cast from the center of gravity of each pattern dot until they reach a maximum pixel intensity gradient. A kernel was created to perform this operation, therefore each ray for each dot could be calculated separately. The blobs bounding boxes are sued to estimate the search length of the rays. The maximum gradient will be yield when there is the sharpest transition between a dark to a bright pixel. In order to achieve sub-pixel precision, the image may be treated as a floating point texture, which also allows the mapping of its 2D coordinates as a pair of floating point values.

The maximum gradient for each ray is treated as a point in the border of the ellipse. Any ellipse fitting method can be used to estimate the ellipse center.

A pose estimation is performed now. To estimate the pattern pose it is necessary to know and store the original position of the pattern dots, the optimal image coordinates of some of these dots with the proper correspondence to the pattern dots, and one or more camera intrinsic characteristics. These cameras characteristics may be obtained before the pattern matching operation and may be used to correct the camera lens distortion and to estimate its view angle.

The objective of the pose estimation is to obtain the 3D transformation that corresponds to the projection of the pattern in the image, and thereby to calculate the location and orientation of the pattern of dots, which, eventually, renders a location and orientation of an object to which the pattern of dots is attached. This transformation includes translation, rotation and scale, providing the 3D distance and orientation between the center of the camera sensor to the pattern location and orientation. I.e., the pose estimation algorithm returns the relative pose between the camera and the pattern. The 3D geometry of the pattern is known, as so the camera intrinsic characteristics. Thanks to the pattern matching algorithm, it is also known that the 2D representation of the pattern in an image. With this information at hand, a linear system with an unknown transformation matrix can be built. The transformation matrix is obtained by solving a linear system, and it gives the relative pose. In order to estimate the pose of the pattern of dots the Ransac method was used. But any other optimization method for solving linear systems could be employed.

FIG. 11 illustrates a system comprising a sticker 110 with a pattern of dots and a device 114. The device 114 may comprise an image projector 111, a physical pointer 112 and/or an image acquisition unit 113 with an image sensor and processing unit. The physical pointer is defined by a tip of the device. The physical pointer 112 is defined by a portion of the device 114 that has a contact surface of a predetermined size which can be placed into contact with a point of interest. The physical pointer 112 is shown with a ball shape. However, the physical pointer may have any other suitable shape such as a triangular shape, a square shape, etc. . . . Furthermore, other configurations of the system may be possible.

FIG. 12 shows a pattern made up from pseudo-randomly placed dots. The randomness of the dots allows for their own identification, e.g. by fingerprinting techniques. Fingerprinting in the present invention is done by recording the individual pattern in a database. A specific individual pattern can later be identified by using the entries in said database. The fact that the dots are circular is advantageous for pose-estimation based on a single dot and increases pixel accuracy of the dot-centre. Besides the pseudo-random location of the dots, also the radius of the dots is pseudo-randomly chosen. Because it is possible to identify the dots, not all dots have to be seen. As long as enough dots are observed to look onto the respective pattern, the system of the present invention will be able to determine the position and attitude of the camera, or the location and orientation of the dot patterns, and thus of the object to which the dot pattern is attached, if the camera is in a stable and fixed position and orientation. Furthermore, if both the object to which the one or more dot patterns are attached and the camera have a movable position and/or orientation, at least the relative position and/or orientation between the dot patterns and the camera can be established by the camera. The pseudo-random size of the dots allows for small dots to be seen at closer range and large dots to be seen at larger ranges. The minimum and maximum radius of the dots determine the range at which the camera pose can be estimated. Patterns can be arbitrarily large in size. For instance, the pattern may have the size of a stamp sized sticker or the pattern may occupy a whole wall or ceiling of a building. The randomness of the size and the location of the dots makes the neighbourhood for every single dot unique. This allows for the identification of the dots without the need for extra identification features like bar codes or orientation markers.

The design of the dot pattern is analysed to generate so-called descriptors for each dot. These descriptors are based on the locations of the neighbouring dot. Later on, the same descriptor can be extracted from an image and matched with the descriptor from the known pattern. FIG. 12 shows some helper lines to indicate how a descriptor can be made. In each image, one dot is analysed as an example (the dot at the origin of the lines). The descriptor is obtained in the following steps. First, for a certain dot the vectors towards all the other dots are created. Then, a reference system is created for this dot, so that the nearest other dot is located at [0, 1]. In other words, the vectors are scaled and rotated, so that the vector to the nearest neighbour dot has unit length and has only a Y-component. These transformed vectors will form the descriptor of this dot.

Furthermore, if a dot has two neighbours at a nearly equal distance, the reference in which the vectors are defined is ambiguous. The ratio of the distance to the nearest neighbour and second nearest neighbour is therefore used as a quality measure for the dot. This quality must be larger than 1.1 (it can by definition not be smaller than 1). That means, the second nearest neighbour must at least be 10% further away than the nearest neighbour. This avoids making wrong descriptors from the image in case of pixel noise. This quality can be enforced when designing a pattern and/or use only dots which have a good quality. As a by-product of the descriptor match, the neighbours are also identified as soon as 1 dot is identified. In that way 5 or more dots are identified at a time. After analysing 2 or 3 dots, over 10 correspondences are found. This is usually enough to estimate a pose well enough. This initial pose can be used to predict the locations of all other dots in the image. Ellipses detected at those locations are then identified as well, allowing refining the pose. This can be iterated until all ellipses are identified. Not only the dots in a pattern can be identified, when two different patterns are placed next to each other, the detection scheme does not get confused. Different patterns are identifiable themselves by their very nature.

FIG. 13A represents a schematic of a system according to one embodiment of the invention. The system 20 comprises a position and attitude sensor (or camera system) 21 and a dot pattern 22. The position and attitude sensor 21 comprises an image acquisition unit 23 and a processing unit 24. The system 21 comprises also a network connection 25, a video output 26 and a serial connection 27.

The processing unit 24 is arranged to perform any of the above explained processing methods. The processing unit 24 is provided with memory units storing computer programs and data arranged to be processed by the processing unit 24 to perform said methods.

The pattern 22 may be, for instance, a printed pattern or a light pattern. The pattern 22 may be printed on or projected in a surface such as a wall or an object. The pattern 22 may be also printed on another medium such as paper or plastic that may be attached (for instance using glue or any other suitable attachment means) to any desired object. The pattern 22 may be placed arbitrarily in a scene. More patterns similar to pattern 22 may be placed in a scene. The image acquisition unit 23 may be an omnidirectional camera. In another embodiment, the image acquisition unit 23 may comprise a plurality of cameras rigidly attached able to take a 360 degrees image. In this way, the image acquisition unit 23 may acquire a 360 degrees image and the position and attitude sensor 21 may process the acquired image in order to estimate the position and/or attitude of the image acquisition unit 23 with respect to the pattern 22 or the plurality of patterns if the acquired image covers at least part of one or more of the plurality of patterns. This provides a very useful device for indoor, high-accuracy positioning and/or attitude calculations.

The system of FIG. 13 may have a structure comprising an elongated shape as the one shown in FIG. 11 wherein the image acquisition unit 23 may be placed on one of the ends of the elongated structure. The elongated structure may comprise a physical pointer 112 on the opposite end to the one where the image acquisition unit 23 is located. The physical pointer 112 can be used to measure 3D point locations.

By means of a calibration procedure, for instance using callipers, the relative location of the physical pointer 112 with respect to the image acquisition unit 23 is determined. The relative location of the physical pointer 112 with respect to the image acquisition unit 23 may be determined using any other suitable method. The relative location of the physical pointer 112 with respect to the image acquisition unit 23 may be stored in a memory. The device may obtain the relative location of the physical pointer 112 with respect to the image acquisition unit 23 from the memory or from any other device. This needs to be done in the 3D reference frame of the camera system. The position and/or attitude of the image acquisition unit 23 in a scene is also determined, for instance by acquiring an image comprising one or more patterns. After that, the position of the physical pointer 112 in the scene is determined based on the determined relative location of the physical pointer 112 with respect to the image acquisition unit 23 and the determined position and/or attitude of the image acquisition unit 23. In this way, the physical pointer 112 can be placed touching a point-of-interest while the image acquisition unit 23 acquires one or more simultaneously images. From the acquired images, the image acquisition unit 23 position and/or attitude can be determined and therefore, as the relative position of the image acquisition unit 23 and the physical pointer 122 is known, the position of the physical pointer 122 is obtained.

In this way, 3D coordinates of points in a scene can be determined just by touching them with the physical pointer 122.

The system of FIG. 13 may further comprise an image projector (such as, for instance, a laser pointer, a laser stripe or a laser grid) pointer configured to illuminate a point in the surroundings and attached to the image acquisition unit 23. The image projector may replace the physical pointer 112. The combination of the image acquisition unit 23 and the image projector allows to generate instantaneous relative 3D measurements.

If the image projector comprises a laser pointer, the system of FIG. 13 can generate a single 3D point by means of triangulation as follows. The laser point projects an illuminated point and the image acquisition unit 23 acquires an image comprising the projected illuminated point. The location of the illuminated point in the image allows to determine in which direction the projected illuminated point is located in space with respect to the image acquisition unit 23. It is also known from where and in which direction the laser pointer is projecting the illuminated point. Based on the direction in which the projected illuminated point is located in space with respect to the image acquisition unit 23, the direction in which the laser pointer is projecting the projected illuminated point and the location of the image acquisition unit 23 and the laser pointer, it can be triangulated where the 3D location of the illuminated point.

If the image projector comprises a laser line projector, the system of FIG. 13 could generate a single 3D profile using triangulation. The laser line projector projects a line of illuminated points. Any point on the line of illuminated points that is projected by the laser line projector must be on a known plane in space (the laser stripe). The image acquisition unit 23 acquires an image comprising the line of illuminated points. From the image, the directions in which the illuminated points are located in space with respect to the image acquisition unit 23 can be determined. Every bright pixel on the image results in a 3D-line intersecting a plane and thus a 3D point in space. All illuminated points on the laser line then form a 3D profile.

If the image projector comprises a laser grid, the system of FIG. 13 could generate relative point clouds. The laser grid is simply a plurality of laser lines and thus can generate many 3D profiles at once, which may be called a point cloud.

The physical pointer 112 may be replaced with a laser pointer configured to illuminate a point in the surroundings. The image acquisition unit 23 can take an image of said illuminated point and the position and attitude sensor 21 may process the acquired image of said illuminated point in order to estimate the 3D position of the point illuminated by the laser pointer.

The system of FIG. 13 may further comprise an image projector (for instance, a laser pointer, a laser stripe or a laser grid) attached to the image acquisition unit 23. The combination of the image acquisition unit 23 and the image projector allows to generate instantaneous relative 3D measurements. If the image projector comprises a laser point, the system could generate a single 3D point. If the image projector comprises a laser stripe, the system could generate a single 3D profile. And if the image projector comprises a laser grid, the system could generate relative point clouds.

As has been observed, the system may be able to determine also the position of the image acquisition unit 23. In this way, the relative 3D measurements can all be accumulated into one single reference frame and form one point cloud so that swiping a scene while acquiring video at, for instance, 50 frames per second, a 3D scanning of a room, scene or object can be performed in a very fast way.

The image projector may comprise also a dot pattern such that the system can also estimate the position of the image projector. In this way, the image projector and the image acquisition unit 23 can be placed at different locations (i.e., the image projector does not need to be attached to the image acquisition unit 23).

It is also possible to generate a full point cloud of an object by hand-holding the image acquisition unit 23 and the image projector unit (as one single unit or as separate units). In this way, the image acquisition unit 23 needs not be positioned by an external system and, by swiping an object with the image projector, the object point cloud can be generated. A user can also scan specific details more densely and accurately by moving closer to those specific details and/or decide not to scan other parts of the room, object or scene. Furthermore, the user can walk around an object to scan it, avoiding the need to stay in line-of-sight or reconstruct feature-less surfaces by using the image projector. This system only requires placing the patterns such that at least one pattern is visible from every location from which measurements need to be performed. Any of the above described systems may be used indoors and/or outdoors, and when water-tight, also under water. The system may track non-static patterns as well, similar to a robotic total station. As has been observed, the pattern may be passive (printed objects) or active (light generating objects, like LEDs). The projected light from the image projector unit can be modulated so that environmental light can be filtered out, increasing the robustness of the system in bright environments (e.g. sunny outdoor scenarios).

Now some possible applications of the above described algorithm will be explained.

Construction

A system comprising one or more stickers with one or more dot patterns, a camera, a processing unit and a pointer or laser could be provided for calculating positions of different objects to which such stickers are fixed. Instead of using one or more stickers with such a dot pattern, the system could provide the dot patterns painted at different locations on the object or in any other way. The system could be provided with a 3D and/or a 2D image acquisition unit comprising an image sensor and a processing unit arranged to receive and process image signals from such an image sensor.

Storages Tanks Inspection by Drones

The invention may be applied for inspecting storage tanks with drones. Patterns of dots may, then, be placed in the storage tanks and the drones may be applied with a device according to the invention for easily performing surveillance tasks on the tanks. Such a device may comprise the laser 111, the image acquisition unit 113 and/or the physical pointer 112 as shown in FIG. 11. However, it may also be implemented by a camera as shown in FIG. 13A or 13B. This setup allows for measuring movements of separate elements of such storage tanks if such elements are provided with one or more patterns of dots.

Integration with an Inertial Measurement Unit (IMU)

The described invention could be combined with one or more sensors. These sensors and the system described in the invention could be attached to a mobile system and positioning data could be provided to the sensors in order to correct the drifting of the sensors.

Refineries

Refineries contain hundreds of kilometres of pipes, thousands of pumps, many distillation columns, storage tanks and flare stacks. Finding and indicating a location wherein a problem is happening, for instance gas or fluid leaking, excessive heat or fire detection, etc, can be very complicated. By placing dot patterns on one or more of the physical elements of those refineries in desired locations, navigation and location of such gas or fluid through the refinery could be improved. Such a navigation could be based on computer models of the refinery and involve augmented reality to guide workers during maintenance tasks.

If cameras are placed as well at those locations arranged to observe the dot patterns and process images taken from those dot patterns, the system could automatically detect points of interest needing attention and if necessary generate alarms. An observer of the images as processed by the cameras would be able to look at the data on monitors and the analysis through a web portal. This portal could e.g. provide an image of the platform, where points of interest are highlighted. By clicking on a point of interest, it would then visualize a motion magnified movie of what happened causing the alarm or triggering the highlight. E.g. the data may show that (a part of) an element with a dot pattern on it has moved as regards location and/or orientation over time, or was even damaged/destroyed.

Transport Motion Monitoring.

Large offshore structures are often assembled onshore, and transported to an offshore location. The lifting of these offshore structures and their transport is a complex process. The invention may provide an elegant solution to perform measurements as it does not require fitting sensors onto the structure, but only dot patterns.

In Door Navigation Systems

The disclosed technology can also be used in indoor navigation systems, in which the dot patterns can be used to identify and mark specific locations. For instance, the invention may be implemented in robotic vacuum cleaners or the like. Said navigation systems can be used within buildings, tunnels, mines, or other environments in which conventional navigation methods are not useable. For instance environments wherein Global Navigation Satellite Systems are not available. The navigation system could also learn through machine learning, e.g. when implemented in a neural network or alike.

Portable Devices

The disclosed technology may be implemented in a mobile phone, smart phone or any suitable kind of portable device, being equipped with the necessary hardware.

Other possible applications of the present invention could be augmented reality, virtual reality, positioning in space, autonomous navigation or parking of vehicles, landing and taking off of aircrafts. The present invention could further be used in hospitals, storage facilities or supermarkets for finding or keeping track of medicines, food. In such environments, navigation for autonomous vehicles or robots can be provided with a device according to the present invention.

Calibrations

Patterns which can only be used when seen as a whole only provide a lot of data points in the centre of an image and relatively little in the corners. For internal camera calibrations this results in biases in the estimated distortion parameters. For camera-to-camera offset calibrations with two cameras ("stereo calibrations") this limits the area in which the pattern can be seen as a whole by both cameras.

Using the described patterns, images can be totally covered and internal calibration can be performed with higher accuracy and less biased results. In stereo calibration scenarios the two cameras do not necessary have to see the same parts of the pattern and the pattern can be presented in much more poses relative to the cameras. This again results less biased and more accurate stereo calibration.

Structure Tracking and Positioning

Since the pattern has no size limits and the space in between the dots does not necessarily have to be white, large structures can be fitted with multiple dots or large sheets with dots. This allows for the structure to be automatically and accurately tracked or positioned.

A typical application would be jacket and topside placement. Pattern based tracking could well replace GNSS based tracking and tracking by total station(s). Cameras provide with or aligned to motion sensors can estimate the live absolute pitch, roll and heading of any structure when these are fitted with the proposed pattern.

Navigation and Dynamic Positioning (DP)

One could place an arbitrary amount of (non identical) patterns in any scene, e.g. on the seabed along a spool route, in arbitrary locations. A Remotely Operated Vehicle (ROV) comprising an Inertial Navigation System (INS) and one or more cameras with a processor to perform any of the above explained methods could fly over the patterns. Processing of images of these dot patterns obtained and processed by the camera would render highly accurate position and orientation data of the ROV as long as any of the patterns is in view, assuming the dot patterns did not change position/orientation. Also, utilising SLAM (simultaneous localization and mapping) techniques, the relative locations of the dot patterns to the ROV can be estimated. An application could be ROV-DP (dynamic positioning). As long as a dot pattern is in view, the ROV is provided with position and attitude measurements that can be used by the ROV to control its thrusters (or other engines) to remain in a drift-free position and attitude.

Docking

A mating tool can be made with an attached pattern. As soon as one sees the pattern, the 6 DOF of the mating tool is known, as long as the camera is calibrated to the motion sensor on the ROV. Depending on the positioning accuracy of the ROV, also the flange position can be instantaneously estimated as soon as the mating tool is in view.

Robot-Arm Positioning

Patterns can be attached to an ROV arm. When observed from a fixed, forward pointing camera, the robot arms position and attitude can be estimated continuously. This can be useful for example during a so-called bathy-traverse. In this procedure a bathymetric sensor is held next to an LBL transponder to measure its depth. Instead of having the bathymetric sensor attached to a cable and occupying the robot arm for the whole dive, now the robot arm itself can be referenced to the bathymetric sensor on the ROV itself. The procedure would now be to hold a reference point on the ROV arm next to the LBL transponder, keeping the ROV arm free for other operations afterward. This could easily save a dive during metrology operations. Also, by touching a known point on a structure, the ROV can position-fix itself. This is common practice already albeit by butting up a known fixed point on the ROV to the known absolute point on the structure on the seabed. This can now be done with the robot arm, which is much quicker since it requires less flying skills from the ROV.

A whole range of new possibilities arises due to the fact that the pattern can be arbitrarily large or small and is extremely robust in detection, while accuracy remains the same as any other pattern. Also having multiple patterns in view is not a problem, while detection algorithms for regular patterns get confused or only detect 1 pattern.

FIG. 13B shows another example of a camera 307 that can be used in the present invention to receive images and process those images.

The example camera 307 has a built-in processing unit 309 which is connected to a lens system 313, a light detector 311, a clock 23, a memory 315, one or more position and/or orientation measurement components 316, an output unit 317, an input unit (or user interface) 319, electronic networking module(s) 320, and a light generating device 321.

The lens system 313 is shown to be connected to the light detector 311. This latter "connection" need not be a physical connection. Here, "connection" is intended to refer to a situation where the lens system 313 is arranged to receive ambient light and focus the received ambient light onto the light detector 311. The light generating device 321 is shown to be "connected" to the lens system 313 too. Again, this latter "connection" need not be a physical connection. Here, "connection" is intended to refer to a situation where the lens system 313 is arranged to receive light from the light generating device 321 and transmit such received light, possibly after suitable focussing, to the pattern of dots. The lens system may comprise one or more lenses. Not all functional elements shown in FIG. 13B need be present as will be apparent from the following description.

All connections intended for transmission of data may be physical connections (wires) however, alternatively they may be wireless and based on transmission of electromagnetic/light radiation. The processing unit 309 may be any suitable processing unit known from the art.

The lens system 313 is arranged such that it receives light from the pattern of dots and focuses it on the light detector 311. It may also be arranged to receive light generated by light generating device 321 and to transmit it, possibly after focusing, towards the pattern of dots. The light detector 311 preferably comprises a set of light sensitive elements (pixel) arranged in a 2D matrix forming a camera's image plane, like a CCD-sensor or a CMOS-sensor.

The lens system 113 may be refractive or non-refractive. The lens system 313 can be a wide-angle lens system, a half-sky lens, a 360 degrees lens, a tele-lens or any other suitable imaging lens. The lens system 313 can optionally be provided with one of more optical filters, whereby such filters can be one of optical low-pass filter, optical band-pass filter, optical high-pass filter, polarization filter, color filter, dichroitic filter, and neutral density filter.

The light detector 311 converts the received light into an image signal. The image signal is a set of electronic signals, here called pixel signals. Each pixel signal is generated by one light sensitive element and has a value depending on the light intensity of light received by the light sensitive element. Thus, the pixel signals may also relate to the object to which the pattern of dots is attached and its surroundings.

The light detector 311 is, preferably, positioned such that its light sensitive elements are in the vicinity of the focal plane of the lens system 313. In another preferred embodiment, the light detector 311 is positioned at a position within the focal distance of the lens system 313 such that the image is de-focused to a certain amount, resulting in a beyond infinity focus condition. In such an embodiment, the image processing may include super-resolution imaging based on defocusing techniques, thereby enabling sub-pixel resolutions. A resolution of $1/100$ or even better of a pixel can then be obtained.

The processing unit 309 is arranged to receive the pixel signals from the light detector 311 and store them in memory 315. The pixel signals may be stored by processing unit 309 as a single picture, preferably with a time stamp and/or position stamp indicating the position of camera 307. However, optionally, the pixel signals are stored by processing unit 309 as a series of pictures together forming a video, in which each picture is provided with a time stamp and/or position stamp indicating the position of camera 307.

Clock 23 provides clock signals to processing unit 23, as known to a person skilled in the art. The clock signals are used for the normal processing of processing unit 309. Processing unit 309 may base the time stamp on these clock signals. However, camera 307 may also be equipped with a GNSS unit receiving time signals from a satellite or may receive time signals from another suitable source.

Memory 315 may comprise different types of sub-memories, like ROM (Read Only Memory)/Flash types of memory storing suitable program instructions and data to run the processing unit 309. Also, memory will comprise suitable RAM (Random Access Memory) types of memory for storing temporary data like the data received from light detector 311. Memory 315 may also comprise cache type memory. Some or all of the sub-memories may be physically located remote from the other components. Processing unit 309 may also be arranged to send all pixel signals to a remote unit via electronic networking module(s) 320 for external storage and processing. A local copy of these pixel signals may then, but need not be, stored in a local memory 315 within camera 307.

Memory 315 may store initial position data indicating the initial position of camera 307. Such initial position data may have been established by using a theodolite and then be stored by a user. Such initial position data can also result from a measurement made by the camera 307 itself. Memory 315 also stores a camera ID identifying camera 307 and being used by processing unit 309 in external communications with other devices to identify itself to those other external devices.

Position and/or orientation measurement components 316 may include one or more accelerometers and/or gyrometers/gyroscopes, as is known to a person skilled in the art. They may also include the above mentioned GNSS unit. Such accelerometers and/or gyrometers/gyroscopes measure the camera's own motion and derive an updated camera position and orientation from such measurements. The updated camera position and/or orientation is then stored by processing unit 309 in memory 315. By doing so, changing camera positions and/or orientations can be taken into account when measuring the position of the one or more patterns of dots. Moreover, a three-axis accelerometer package can also measure the direction of earth gravity when static. A 3D gyro package of sufficient performance can measure the direction of the earth rotation axis (also when static).

Output unit 317 may comprises one or more sub-output-units, like a display and a speaker.

Input unit 319 may comprise one or more sub-input-units like a keyboard and a microphone. The display and keyboard may be made as two distinct touch screens. However, they may also be implemented as a single touch screen.

Electronic networking modules 320 may comprise one or more of LTE (Long Term Evolution), Ethernet, WiFi, Bluetooth, Powerline communication, Low Power Wide Area Network (e.g. Lora™ and Sigfox™), and NFC (Near Field Communication) modules. Technology known from the IoT (Internet of Things) may be used, as well as any proprietary communication protocol.

The light generating device 321 comprises at least one light source like a Light Emitting Diode (LED) source configured to generate light. Processing unit 309 is arranged to control each LED source such that they generate a light beam. Alternatively, the light generating device 321 comprises at least one of VCSELs (Vertical-Cavity Surface-Emitting Laser), EELs (Edge Emitting Laser), incandescent light bulb, fluorescent light sources, quantum dots, and light converting elements.

FIG. 14 represents a schematic of a system according to one embodiment of the invention. The system 200 comprises a target spacecraft 202 and a chaser spacecraft 204. An example of a target spacecraft 202 is a satellite moving in space at a fixed location and orientation relative to the earth. An example of a chaser spacecraft 204 is a space unit controlled to be docking with the target spacecraft 202 e.g. for maintenance purposes or exchange staff.

The target spacecraft 202 may comprise a transponder 206, a GNSS receiver 207, a processing system 203 and/or one or more LEDs 208 for emitting, e.g. visible, light. Instead of LEDs any other suitable light source may be used. The target spacecraft 202 is provided with one or more dot patterns as explained above.

The chaser spacecraft 204 comprises a GNSS receiver 210, a transponder 212, a camera 214, a processing system 216 and a propulsion control system, like thrusters 218. The camera 214 may be an optical camera or any other kind of suitable camera. The processing system 203 and/or the processing system 206 may be the processor of FIG. 13B. The transponder 206 and the transponder 212 may be suitable for receiving L-band (frequencies in the radio spectrum from 1 to 2 gigahertz) GNSS corrections from Geostationary Earth Orbit (GEO) system. The GNSS corrections allow to improve the standalone GNSS absolute position accuracy of several meters down to sub-decimeter, and to know the spacecraft velocity with an uncertainty of centimeter/second, by correcting the errors existing in the GNSS ephemeris data. The SpaceStar™ software is a particular commercial example of this technology. The aim of the system 200 presented here is for the chaser spacecraft 204 to autonomously navigate in proximity to the target spacecraft 202 without compromising spacecraft structural integrity while minimising fuel consumption and allowing even auto-docking in orbit. To that effect, the processing system 216 is arranged to perform any of the above explained processing methods. The processing system 216 is provided with memory units storing computer programs and data arranged to be processed by the processing system to perform said methods. Also, the processor system 216 is arranged to control navigation of the chaser spacecraft 204 in any possible way known in the art.

FIG. 15 shows a flow chart of an example of the functioning of the system of FIG. 14 as controlled by processor system 216. In step 230, the chaser spacecraft 204 performs GNSS-based high-accuracy absolute navigation by thrusters 218 as controlled by processor system 216 for an initial rendezvous with the target spacecraft 202. This initial rendezvous may be down to a predetermined safety distance between the target spacecraft 202 and the chaser spacecraft 204 (for instance, the predetermined safety distance may be less than 10 meters) and may be performed by using data of a prior orbit of the target spacecraft 202. The prior orbit of the target spacecraft 202 may be computed from a last known position and/or known velocity of the target spacecraft 202. The prior orbit of the target spacecraft 202 may be communicated and/or uploaded to the chaser spacecraft 204 from the ground. By using SpaceStar™ software in processor system 216, it is possible to reduce the safety distance between the target spacecraft 202 and the chaser spacecraft 204 compared to using standalone GNSS because the position and/or the velocity of the chaser spacecraft 204 can be known in real-time with an increased level of accuracy. This also allows to minimise the fuel consumption for leveraging. SpaceStar™ software may allow to know the position of the chaser spacecraft 204 with an accuracy of approximated up to 10 centimetres and may allow to know the velocity of the chaser spacecraft 204 with an accuracy up to 1 centimetre per second. In step 232, the chaser spacecraft 204 automatically switches to relative navigation mode after reaching the safety distance to the target spacecraft 202. In the relative navigation mode, the chaser spacecraft 204 may use an optical vision system in order to estimate a relative distance to the target spacecraft 202 and/or an orientation with respect to the target spacecraft 204. The optical vision system may comprise the camera 214 and processor system 216. The camera 214 may obtain location information of the one or more LEDs 208 on the target spacecraft 202. In another embodiment, the camera 214 may obtain location information from one or more dot patterns attached/located on the target spacecraft 202. The one or more dot patterns may be any of the dot patterns that have been explained with relation to previous embodiments and figures. The optical vision system may use said location information of the one or more LEDs 208 and/or the one or more patterns for estimating the relative distance from the chaser spacecraft 204 to the target spacecraft 202 and/or for estimating the orientation of the chaser spacecraft 202 with respect to the target spacecraft 204. Any one of the methods explained above may be used for that purpose.

Additionally, in the relative navigation mode, step 232, the chaser spacecraft 204 may also use a relative GNSS navigation. In the relative GNSS navigation, the GNSS receiver 207 of the target spacecraft 202 can compute the absolute position of the target spacecraft 202 independently of the chaser spacecraft 204. The GNSS receiver 210 of the chaser spacecraft 204 can also independently compute the absolute position of the chaser spacecraft 204. The chaser spacecraft 204 may be mainly interested in knowing the difference in position between the chaser and the target spacecrafts (i.e., the relative position between the chaser and the target spacecrafts). The chaser spacecraft 204 may receive position information of the target spacecraft 202 in order to be able to compute its relative position. The chaser spacecraft 204 may receive position information of the target spacecraft 202 following, for instance, any of the below approaches:

In a SpaceStar™-based solution, using the so-called Precise Point Positioning (PPP) technique, the target spacecraft 202 sends the absolute GNSS position and/or the absolute velocity taken by the GNSS receiver 207 to the chaser spacecraft 204, and the chaser spacecraft 204 subtracts its own absolute position from the absolute position and/or velocity of the target spacecraft 204 to obtain the relative position and/or velocity of the chaser spacecraft 204. This method is relatively efficient, as the target spacecraft 202 needs to communicate a minimum number of values to the chaser spacecraft 204 for performing the calculation of the relative position of the chaser spacecraft 204, namely the latitude, the longitude and the height of the target spacecraft 202. The precision of this method may be suboptimal as the biases in absolute positions can be still significant, and may be different in the target spacecraft and the chaser spacecraft. The expected accuracy of this method may be in the order of 5 centimeter.

In a Real Time Kinematic (RTK)-based solution, the target spacecraft 202 sends to the chaser spacecraft 204 raw measurements taken by the GNSS receiver 207 of the target spacecraft 202. The raw measurements sent by the chaser spacecraft 204 may comprise time, code and/or carrier-phase observations. This allows the chaser spacecraft 204 to combine the GNSS measurements (code and/or carrier-phase observations) with the received information from the GNSS receiver 207 in the chaser spacecraft. Then, the chaser spacecraft 204 estimates the relative distance between the target spacecraft 202 and the chaser spacecraft 204 by using a moving-baseline RTK technique and the received raw measurements. By using the code observations, the chaser spacecraft 204 may estimate the relative distance between the target spacecraft 202 and the chaser spacecraft 204 up to sub meter accuracy. By using the carrier-phase data the chaser spacecraft 204 may estimate the relative distance between the target spacecraft 202 and the chaser spacecraft 204 up to centimeter level. Combining these relative observations to calculate the relative vector (relative position) between the chaser and the target spacecraft may be more accurate than the PPP-based solution (expected accuracy is in the order of 1-2 centimeters, which might be the accuracy required for safe docking). However, the efficiency of this method in terms of required communication bandwidth is lower than the PPP-based solution, as it requires two numerical values per satellite and time (for potentially 10's of satellites).

In step 234, the target spacecraft 202 communicates the GNSS information (either absolute PPP position or raw RTK measurements) to the chaser spacecraft 204. The target spacecraft 202 may communicate the GNSS information to the chaser spacecraft 204 by using a local radio link. The target spacecraft 202 may communicate the GNSS information to the chaser spacecraft by modulating the light of the one or more LEDs 208 in amplitude. In this way, the vision system may be used both as a navigation system as well as a communication system for exchanging GNSS information between the chaser spacecraft 204 and the target spacecraft 202 and no additional hardware is required. The light generated by the one or more LEDs 208 may be modulated with a first modulation scheme for suppressing the ambient light in order to improve robustness and accuracy of the data transmission. The light generated by the one or more LEDs 208 may be then modulated with a second modulation scheme which may be then super positioned to the first modulation scheme to facilitate said data transfer.

The camera 214 of the chaser spacecraft 204 may be used as an optical data receiver for receiving data from the target spacecraft 202. In this case, the available communication bandwidth would be limited by the number of LED's 208 of the target spacecraft 202 and a frame rate of the camera 214. The chaser spacecraft 204 may further comprise a dedicated high speed optical receiver for receiving data from the target spacecraft 202. This might be very helpful for the transfer of raw GNSS data at a high rate.

Finally, in step 236, the chaser spacecraft 204 estimates the absolute and/or relative position of the target spacecraft 202 based on the received GNSS information and/or the location information obtained by the optical vision system. The chaser spacecraft 204 may estimate the absolute and/or relative position of the target spacecraft 202 using an integrated Kalman filter and may command the thruster to approximate and/or dock with the target spacecraft 202 in an automated way based on said estimated absolute and/or relative position.

The visual observations of the camera 214 (and optional the GNSS observations) may be integrated with an inertial measurement unit (IMU) arranged within chaser spacecraft 204. An IMU is an electronic device that measures and reports a body's specific force, angular rate, and/or sometimes the magnetic field surroundings the body, using a combination of accelerometers and gyroscopes, sometimes also magnetometers. IMUs are typically used to maneuver aircraft, including unmanned aerial vehicles (UAVs), among many others, and spacecrafts, including satellites and landers. Adding both an IMU and a Kalman filter in the chaser spacecraft 204 to integrate the IMU observations, provide the following benefits compared to just visual observations: increased robustness, accuracy and update rates at a just marginally increase of power budget and physical size. For instance, the IMU and Kalman filter may provide the following advantages:

Visual observation outlier detection/rejection
   Robustness against temporary drop out of any of the other observations due to the added redundancy
   Noise reduction of visual and/or GNSS observations
   Higher update rates at a marginally increased power budget (IMU observations may fill in the gaps between the visual and/or GNSS observations), for instance from a typical visual update rate of 10 Hertz to 100 Hertz or even 1000 Hertz. MEMS (Micro Electro Mechanical System) IMU's are typically low power. Image processing is computationally expensive, power hungry and scales up almost linearly with the update rate.

By integrating all observations with a Kalman filter (and an error model for these biases), the resulting integrated output will have the benefits of both sensors, and suppress the disadvantages of both sensors: noise free, bias free, high update rate, and due to the fact that the Kalman filter can accurately predict (short term) a position (with a known accuracy), it can compare the vision based position observation with the predicted position. If this position is outside the error bounds that the Kalman filter predicts, it will ignore the observation. If it would not do that, the Kalman filter will start to drift caused by the erroneous visual observation.

IMU's on spacecrafts such as satellites in orbit do not sense the earth gravity field, so the Kalman filter implementation for integration of just IMU data and visual data may be different. In Kalman filter implementations on earth, the earth gravity vector, sensed by the IMU accelerometers, is important to estimate the gyro biases. In absence of the earth gravity vector, the visual information of the target could be used by the chaser spacecraft 204 to estimate the relative rotation rate biases. If absolute GNSS positions are included as an aiding input, the gravitational acceleration becomes observable again so that a regular Kalman filter implementation, in the earth reference frame, can be used. In that case, the Kalman filter state only needs to be extended to also estimate the position and/or velocity and/or rotation and/or rates of the target spacecraft as soon as the relative measurements like relative GPS or vision need to be incorporated.

The application of this method is obviously not limited to space vehicles, and could be applied on land and also subsea for ROV and Autonomous Underwater Vehicle (AUV).

The chaser spacecraft 204 may further comprise a second camera. The camera 214 may take a first image of the target spacecraft 202 and the second camera may take a second image of the target spacecraft 202. The first image and the second image may comprise the same feature of the target spacecraft 202. In this way, image processing of the first and the second image may identify identical (but arbitrary) features on the target spacecraft 202 which can be triangulated to determine the 3D (relative) position of these features. The chaser spacecraft 204 may comprise more cameras thereby increasing the number of observations. The features in the first and the second image may be detected by using scale-invariant feature transform (SIFT) or any other feature detection algorithm for computer vision suitable to detect and describe the features in the first and the second image. In astrodynamics, the orbital maneuvers made by a thruster burns that are needed to keep a spacecraft in a particular assigned orbit are called orbital station-keeping. This method may be used for station keeping by tracking multiple features on the target spacecraft 202 and deriving 3D position change and 3D attitude change vectors, which can then be used in a feedback loop to control the chaser spacecraft 202 to minimize the change (station keeping). By slowly adjusting the requested relative 3D reference position and 3D reference attitude vectors, the chaser spacecraft 204 may be maneuvered closer to the target spacecraft 202 in a controlled way. The application of this method is again not limited to space vehicles, and could, for instance, be applied on land and also subsea for ROV and AUV.

The chaser spacecraft 204 may perform autonomous orientation close to the target spacecraft 202 without the need of any prior knowledge of the target spacecraft 202, and/or without dedicated systems on the target spacecraft 202 to establish a relative position in the following way. The camera 214 may observe an arbitrary target which may be moving relative to the chaser spacecraft 204. At a moment in time, the chaser spacecraft 204 may freeze its relative position with respect to the target spacecraft 202. The camera 214 acquires and stores an image of the target spacecraft 202 at that moment in time. The camera 214 acquires subsequent images to compute differences in 3D attitude and in 3D position between the subsequent images and the stored image. As relative attitude and position in the stored image and the subsequent images may be correlated, the IMU observations are used to decorrelate them. The IMU is capable of measuring attitude change fully independent of position change. By feeding these error vectors to the propulsion control system 218 in a feedback loop, the propulsion control system may be programmed to minimize the position and attitude errors and thus keep the chaser spacecraft 204 relative to the (moving or static in reference to the earth) target spacecraft 202. By slowly manipulating the stored image (e.g. zooming in/out, moving or rotating the stored image), the chaser spacecraft 204 can be maneuvered relative to the target spacecraft 204 in a controlled way. The stored image can be refreshed after each maneuver, as the manipulated stored image might not be completely identical to the new image on the camera 214 due to a small change in perspective. The scale of the detected displacements is initially unknown and may cause under or overcompensation by the station keeping control system. This under or over compensation however is measurable, so the control algorithms can be designed to estimate this parameter (distance and/or size of the object) over time in a few iterations. Once again, the application of this method is obviously not limited to space vehicles, and could be applied on land and also subsea for ROV and AUV.

The invention claimed is:
1. An apparatus for determining a spatial property in a 3D-space, the apparatus comprising:
   a physical pointer, a camera and a position and orientation measurement system, wherein a first object in the 3D-space comprises a pattern on it, wherein the physical pointer is configured to contact a surface area of a second object in the 3D-space, wherein the camera is configured to capture, at a position of the camera with respect to the first object, image data comprising an image of the pattern, and wherein the position and orientation measurement system is configured to determine a heading, position, verticality, attitude, and/or inclination of the camera based on the image of the pattern, and determine, based on the determined heading, position, verticality, attitude, and/or inclination of the camera and a relative position of the physical pointer with respect to the camera, the spatial property of the surface area by the physical pointer.

2. The apparatus of claim 1, wherein the spatial property comprises 3D coordinates of the surface area.

3. A method for determining a spatial property in a 3D-space using a device provided with a physical pointer, with a camera and with a position and orientation measurement system, wherein a first object in the 3D-space comprises a pattern on it, the method comprising:

placing the physical pointer into contact with a surface area of a second object in the 3D-space;

capturing, at a position of the camera with respect to the first object, image data comprising an image of the pattern;

determining, by the position and orientation measurement system, a heading, position, verticality, attitude, and/or inclination of the camera based on the image of the pattern; and determining, based on the determined heading, position, verticality, attitude, and/or inclination of the camera and a relative position of the physical pointer with respect to the camera, the spatial property of the surface area contacted by the physical pointer.

4. The method of claim 3, wherein the spatial property comprises 3D coordinates of the surface area.

5. An apparatus for determining a spatial property in a 3D-space, the apparatus comprising:

a pattern projector, a camera and a position and orientation measurement system, wherein the pattern projector is configured to project a pattern on a surface area of an object in the 3D-space, wherein the camera is configured to capture, at a position of the camera with respect to the pattern, image data comprising an image of the pattern, wherein the position and orientation measurement system is configured to determine a heading, position, verticality, attitude, and/or inclination of the camera based on the image of the pattern and a direction on which the patter is projected, and determine, based on the determined heading, position, verticality, attitude, and/or inclination of the camera and the direction on which the pattern is projected, the spatial property of the surface area.

6. The apparatus of claim 5, wherein the pattern projector is configured to project a single point of light.

7. The apparatus of claim 5, wherein the pattern projector is configured to project a line of points of light.

8. The apparatus of claim 5, wherein the pattern projector is configured to project a grid of points of light.

9. A method for determining a spatial property in a 3D-space using a device provided with a pattern projector, with a camera and with a position and orientation measurement system, the method comprising:

projecting, by the pattern projector, a pattern on a surface area of an object in the 3D-space;

capturing, at a position of the camera with respect to the pattern, image data comprising an image of the projected pattern on the surface area;

determining, by the position and orientation measurement system, a heading, position, verticality, attitude, and/or inclination of the camera based on the image of the projected pattern on the surface area and a direction on which the pattern is projected; and determining, based on the determined heading, position, verticality, attitude, and/or inclination of the camera and the direction on which the pattern is projected, the spatial property of the surface area.

10. The method of claim 9, wherein the pattern projector is configured to project a single point of light.

11. The method of claim 9, wherein the pattern projector is configured to project a line of points of light.

12. The method of claim 9, wherein the pattern projector is configured to project a grid of points of light.

* * * * *